United States Patent
Singarayan et al.

(10) Patent No.: US 12,184,521 B2
(45) Date of Patent: Dec. 31, 2024

(54) FRAMEWORK FOR PROVIDING HEALTH STATUS DATA

(71) Applicant: VMware LLC, Palo Alto, CA (US)

(72) Inventors: Babu Singarayan, Tracy, CA (US); Vijay Talati, Fremont, CA (US); Ranganathan Rajagopalan, Fremont, CA (US)

(73) Assignee: VMware LLC, Palo Alto, CA (US)

( * ) Notice: Subject to any disclaimer, the term of this patent is extended or adjusted under 35 U.S.C. 154(b) by 0 days.

(21) Appl. No.: 18/195,854

(22) Filed: May 10, 2023

(65) Prior Publication Data

US 2024/0291737 A1    Aug. 29, 2024

(30) Foreign Application Priority Data

Feb. 23, 2023    (IN) .............................. 202341012430

(51) Int. Cl.
| | |
|---|---|
| *H04L 43/06* | (2022.01) |
| *G06F 9/54* | (2006.01) |
| *H04L 43/0817* | (2022.01) |
| *H04L 61/3015* | (2022.01) |

(52) U.S. Cl.
CPC .............. *H04L 43/06* (2013.01); *G06F 9/547* (2013.01); *H04L 43/0817* (2013.01); *H04L 61/3015* (2013.01)

(58) Field of Classification Search
CPC . H04L 43/06; H04L 43/0817; H04L 61/3015; G06F 9/547
See application file for complete search history.

(56) References Cited

U.S. PATENT DOCUMENTS

| | | |
|---|---|---|
| 5,842,043 A | 11/1998 | Nishimura |
| 6,219,699 B1 | 4/2001 | McCloghrie et al. |
| 6,347,374 B1 | 2/2002 | Drake et al. |
| 6,615,230 B2 | 9/2003 | Nishimura |

(Continued)

FOREIGN PATENT DOCUMENTS

| | | |
|---|---|---|
| CA | 3119423 A1 | 3/2018 |
| CN | 102124456 A | 7/2011 |

(Continued)

OTHER PUBLICATIONS

Author Unknown, "What is a Data Center?," Cyberpedia, Month Unknown 2022, 5 pages, Palo Alto Networks, retrieved from https://www.paloaltonetworks.com/cyberpedia/what-is-a-data-center.

(Continued)

*Primary Examiner* — Jimmy H Tran
(74) *Attorney, Agent, or Firm* — Quarles & Brady LLP

(57) ABSTRACT

Some embodiments provide a method for a health monitoring service that monitors a system with a set of services executing across a set of one or more datacenters. For each of multiple services monitored by the health monitoring service, the method (1) contacts an API exposed by the service to provide health monitoring data for the service and (2) receives health monitoring data for the service that provides, for each of multiple aspects of the service, (i) a status and (ii) an explanation for the status in a uniform format used by the APIs of each of the services. At least two different services provide health monitoring data in the uniform format for different groups of aspects of the services.

25 Claims, 15 Drawing Sheets

(56) References Cited

U.S. PATENT DOCUMENTS

| | | |
|---|---|---|
| 7,079,544 B2 | 7/2006 | Wakayama et al. |
| 7,260,716 B1 | 8/2007 | Srivastava |
| 7,502,884 B1 | 3/2009 | Shah et al. |
| 7,539,745 B1 | 5/2009 | Wang et al. |
| 7,802,000 B1 | 9/2010 | Huang et al. |
| 7,965,699 B1 | 6/2011 | Accardi et al. |
| 8,054,832 B1 | 11/2011 | Shukla et al. |
| 8,149,734 B2 | 4/2012 | Lu |
| 8,479,275 B1 | 7/2013 | Naseh |
| 8,611,351 B2 | 12/2013 | Gooch et al. |
| 8,625,616 B2 | 1/2014 | Vobbilisetty et al. |
| 8,660,129 B1 | 2/2014 | Brendel et al. |
| 8,707,417 B1 | 4/2014 | Liang et al. |
| 9,069,599 B2 | 6/2015 | Martinez et al. |
| 9,215,213 B2 | 12/2015 | Bansal et al. |
| 9,294,270 B2 | 3/2016 | Wainner et al. |
| 9,311,122 B2 | 4/2016 | Guay et al. |
| 9,330,161 B2 | 5/2016 | D'Amato et al. |
| 9,432,215 B2 | 8/2016 | Stabile et al. |
| 9,571,304 B2 | 2/2017 | Koponen et al. |
| 9,602,312 B2 | 3/2017 | Koponen et al. |
| 9,672,054 B1 | 6/2017 | Gupta et al. |
| 9,672,060 B2 | 6/2017 | Behere et al. |
| 9,825,851 B2 | 11/2017 | Agarwal et al. |
| 9,847,938 B2 | 12/2017 | Chanda et al. |
| 9,876,711 B2 | 1/2018 | Chu et al. |
| 9,906,560 B2 | 2/2018 | Jain et al. |
| 9,912,616 B2 | 3/2018 | Shen et al. |
| 9,923,811 B2 | 3/2018 | Agarwal et al. |
| 9,977,688 B2 | 5/2018 | Nipane et al. |
| 10,091,028 B2 | 10/2018 | Koponen et al. |
| 10,110,417 B1 | 10/2018 | Hankins et al. |
| 10,120,668 B2 | 11/2018 | Palavalli et al. |
| 10,129,142 B2 | 11/2018 | Goliya et al. |
| 10,133,619 B1* | 11/2018 | Nagpal ................ G06F 11/079 |
| 10,135,675 B2 | 11/2018 | Yu et al. |
| 10,142,127 B2 | 11/2018 | Cherian et al. |
| 10,162,656 B2 | 12/2018 | Palavalli et al. |
| 10,187,302 B2 | 1/2019 | Chu et al. |
| 10,193,708 B2 | 1/2019 | Koponen et al. |
| 10,205,771 B2 | 2/2019 | Palavalli et al. |
| 10,241,820 B2 | 3/2019 | Lambeth et al. |
| 10,243,797 B2 | 3/2019 | Lambeth et al. |
| 10,243,834 B1 | 3/2019 | Shekhar et al. |
| 10,243,846 B2 | 3/2019 | Jiang et al. |
| 10,243,848 B2 | 3/2019 | Agarwal et al. |
| 10,257,049 B2 | 4/2019 | Fried et al. |
| 10,298,489 B2 | 5/2019 | Williams et al. |
| 10,326,639 B2 | 6/2019 | Stabile et al. |
| 10,333,959 B2 | 6/2019 | Katrekar et al. |
| 10,339,123 B2 | 7/2019 | Venkatesh et al. |
| 10,412,018 B1 | 9/2019 | Feng et al. |
| 10,560,343 B1 | 2/2020 | Cartsonis et al. |
| 10,579,945 B2 | 3/2020 | Gaurav et al. |
| 10,585,682 B2* | 3/2020 | Jain ........................ G06F 9/451 |
| 10,587,479 B2 | 3/2020 | Shakimov et al. |
| 10,601,637 B2 | 3/2020 | Stabile et al. |
| 10,601,705 B2 | 3/2020 | Hira et al. |
| 10,616,279 B2 | 4/2020 | Nimmagadda et al. |
| 10,637,800 B2 | 4/2020 | Wang et al. |
| 10,673,752 B2 | 6/2020 | Agarwal et al. |
| 10,693,833 B2 | 6/2020 | Mathew et al. |
| 10,832,224 B2 | 11/2020 | Palavalli et al. |
| 10,841,152 B1* | 11/2020 | Humphreys ............ H04L 67/10 |
| 10,862,753 B2 | 12/2020 | Hira et al. |
| 10,880,158 B2 | 12/2020 | Lambeth et al. |
| 10,880,170 B2 | 12/2020 | Wang et al. |
| 10,897,420 B1 | 1/2021 | Pianigiani et al. |
| 10,908,938 B2 | 2/2021 | Palavalli et al. |
| 10,942,788 B2 | 3/2021 | Palavalli et al. |
| 10,999,154 B1 | 5/2021 | Ahrenholz et al. |
| 11,057,275 B1 | 7/2021 | Arunachalam et al. |
| 11,088,902 B1 | 8/2021 | Palavalli et al. |
| 11,088,916 B1 | 8/2021 | Chandrashekhar et al. |
| 11,088,919 B1 | 8/2021 | Chandrashekhar et al. |
| 11,115,301 B1 | 9/2021 | Margarian et al. |
| 11,133,958 B2 | 9/2021 | Torvi et al. |
| 11,153,170 B1 | 10/2021 | Chandrashekhar et al. |
| 11,171,834 B1* | 11/2021 | Bockelmann ......... G06F 9/44505 |
| 11,182,163 B1 | 11/2021 | Beals et al. |
| 11,258,668 B2 | 2/2022 | Chandrashekhar et al. |
| 11,303,557 B2 | 4/2022 | Chandrashekhar et al. |
| 11,316,773 B2 | 4/2022 | Dubey et al. |
| 11,336,486 B2 | 5/2022 | Sharma et al. |
| 11,336,556 B2 | 5/2022 | Chandrashekhar et al. |
| 11,343,227 B2 | 5/2022 | Vaidya et al. |
| 11,343,283 B2 | 5/2022 | Vaidya et al. |
| 11,374,817 B2 | 6/2022 | Chandrashekhar et al. |
| 11,374,850 B2 | 6/2022 | Chandrashekhar et al. |
| 11,381,456 B2 | 7/2022 | Manzanilla et al. |
| 11,394,634 B2 | 7/2022 | Chandrashekhar et al. |
| 11,438,238 B2 | 9/2022 | Chandrashekhar et al. |
| 11,445,021 B2* | 9/2022 | Mallikarjuna Durga Lokanath .... G06F 9/5077 |
| 11,496,392 B2 | 11/2022 | Agarwal et al. |
| 11,509,522 B2 | 11/2022 | Palavalli et al. |
| 11,528,214 B2 | 12/2022 | Chandrashekar et al. |
| 11,546,244 B1* | 1/2023 | Kers .................... H04L 41/046 |
| 11,601,474 B2 | 3/2023 | Vaidya et al. |
| 11,683,233 B2 | 6/2023 | Rogozinsky et al. |
| 11,736,383 B2 | 8/2023 | Chandrashekhar et al. |
| 2002/0029270 A1 | 3/2002 | Szczepanek |
| 2002/0093952 A1 | 7/2002 | Gonda |
| 2002/0131414 A1 | 9/2002 | Hadzic |
| 2003/0046347 A1 | 3/2003 | Nishimura |
| 2003/0167333 A1 | 9/2003 | Kumar et al. |
| 2003/0185151 A1 | 10/2003 | Kurosawa et al. |
| 2003/0185152 A1 | 10/2003 | Nederveen et al. |
| 2003/0188114 A1 | 10/2003 | Lubbers et al. |
| 2003/0188218 A1 | 10/2003 | Lubbers et al. |
| 2004/0042454 A1 | 3/2004 | Zabihi et al. |
| 2004/0052257 A1 | 3/2004 | Abdo et al. |
| 2004/0073596 A1* | 4/2004 | Kloninger ............... H04L 67/02 709/200 |
| 2005/0083953 A1 | 4/2005 | May |
| 2005/0190757 A1 | 9/2005 | Sajassi |
| 2005/0235352 A1 | 10/2005 | Staats et al. |
| 2005/0288040 A1 | 12/2005 | Charpentier et al. |
| 2006/0002370 A1 | 1/2006 | Rabie et al. |
| 2006/0069594 A1 | 3/2006 | Yamasaki |
| 2006/0092976 A1 | 5/2006 | Lakshman et al. |
| 2006/0179243 A1 | 8/2006 | Fields et al. |
| 2006/0179245 A1 | 8/2006 | Fields et al. |
| 2006/0193252 A1 | 8/2006 | Naseh et al. |
| 2006/0193300 A1 | 8/2006 | Rawat et al. |
| 2006/0195896 A1 | 8/2006 | Fulp et al. |
| 2006/0221720 A1 | 10/2006 | Reuter |
| 2006/0251120 A1 | 11/2006 | Arimilli et al. |
| 2006/0287842 A1 | 12/2006 | Kim |
| 2006/0291447 A1 | 12/2006 | Siliquini et al. |
| 2007/0058631 A1 | 3/2007 | Mortier et al. |
| 2007/0130295 A1 | 6/2007 | Rastogi et al. |
| 2007/0217419 A1 | 9/2007 | Vasseur |
| 2007/0219653 A1 | 9/2007 | Martin |
| 2007/0239987 A1 | 10/2007 | Hoole et al. |
| 2008/0013474 A1 | 1/2008 | Nagarajan et al. |
| 2008/0049646 A1 | 2/2008 | Lu |
| 2008/0104302 A1 | 5/2008 | Carpio |
| 2008/0133729 A1 | 6/2008 | Fridman et al. |
| 2008/0151863 A1 | 6/2008 | Lawrence et al. |
| 2008/0225853 A1 | 9/2008 | Melman et al. |
| 2008/0268847 A1 | 10/2008 | Mukherjee et al. |
| 2008/0301379 A1 | 12/2008 | Pong |
| 2009/0037367 A1 | 2/2009 | Wein |
| 2009/0070337 A1 | 3/2009 | Romem et al. |
| 2009/0193297 A1 | 7/2009 | Williams et al. |
| 2009/0241192 A1 | 9/2009 | Thomas |
| 2009/0279536 A1 | 11/2009 | Unbehagen et al. |
| 2009/0279545 A1 | 11/2009 | Moonen |
| 2009/0292858 A1 | 11/2009 | Lambeth et al. |
| 2009/0296726 A1 | 12/2009 | Snively et al. |
| 2010/0153701 A1 | 6/2010 | Shenoy et al. |
| 2010/0232435 A1 | 9/2010 | Jabr et al. |
| 2010/0250744 A1 | 9/2010 | Hadad et al. |

(56) References Cited

U.S. PATENT DOCUMENTS

| | | |
|---|---|---|
| 2010/0250784 A1 | 9/2010 | Henry et al. |
| 2010/0257263 A1 | 10/2010 | Casado et al. |
| 2010/0275199 A1 | 10/2010 | Smith et al. |
| 2010/0322255 A1 | 12/2010 | Hao et al. |
| 2011/0032898 A1 | 2/2011 | Kazmi et al. |
| 2011/0047218 A1 | 2/2011 | Nojima et al. |
| 2011/0051714 A1 | 3/2011 | Somes |
| 2011/0085559 A1 | 4/2011 | Chung et al. |
| 2011/0085569 A1 | 4/2011 | Gnanasekaran et al. |
| 2011/0090905 A1 | 4/2011 | Mueller et al. |
| 2011/0103260 A1 | 5/2011 | Jeyatharan et al. |
| 2011/0164752 A1 | 7/2011 | Wainner et al. |
| 2011/0188509 A1 | 8/2011 | Kern et al. |
| 2011/0231602 A1 | 9/2011 | Woods et al. |
| 2011/0299413 A1 | 12/2011 | Chatwani et al. |
| 2012/0014386 A1 | 1/2012 | Xiong et al. |
| 2012/0084406 A1 | 4/2012 | Kumbalimutt |
| 2012/0093035 A1 | 4/2012 | Kidambi et al. |
| 2012/0120964 A1 | 5/2012 | Koponen et al. |
| 2012/0147898 A1 | 6/2012 | Koponen et al. |
| 2012/0163388 A1 | 6/2012 | Goel et al. |
| 2012/0226799 A1 | 9/2012 | Kapur et al. |
| 2012/0236734 A1 | 9/2012 | Sampath et al. |
| 2012/0257634 A1 | 10/2012 | Martillo et al. |
| 2012/0275328 A1 | 11/2012 | Iwata et al. |
| 2013/0018947 A1 | 1/2013 | Archer et al. |
| 2013/0024579 A1 | 1/2013 | Zhang et al. |
| 2013/0042242 A1 | 2/2013 | Kagan |
| 2013/0044636 A1 | 2/2013 | Koponen et al. |
| 2013/0044641 A1 | 2/2013 | Koponen et al. |
| 2013/0044752 A1 | 2/2013 | Koponen et al. |
| 2013/0044761 A1 | 2/2013 | Koponen et al. |
| 2013/0058250 A1 | 3/2013 | Casado et al. |
| 2013/0058335 A1 | 3/2013 | Koponen et al. |
| 2013/0058350 A1 | 3/2013 | Fulton |
| 2013/0058354 A1 | 3/2013 | Casado et al. |
| 2013/0058358 A1 | 3/2013 | Fulton et al. |
| 2013/0060819 A1 | 3/2013 | Lambeth et al. |
| 2013/0060940 A1 | 3/2013 | Koponen et al. |
| 2013/0074065 A1 | 3/2013 | McNeeney et al. |
| 2013/0103817 A1 | 4/2013 | Koponen et al. |
| 2013/0125120 A1 | 5/2013 | Zhang et al. |
| 2013/0132533 A1 | 5/2013 | Padmanabhan et al. |
| 2013/0144992 A1 | 6/2013 | Barabash et al. |
| 2013/0159637 A1 | 6/2013 | Forgette et al. |
| 2013/0212212 A1 | 8/2013 | Addepalli et al. |
| 2013/0215769 A1 | 8/2013 | Beheshti-Zavareh et al. |
| 2013/0254328 A1 | 9/2013 | Inoue et al. |
| 2013/0283090 A1* | 10/2013 | Bradley .............. G06F 11/3089 714/2 |
| 2013/0286833 A1 | 10/2013 | Torres et al. |
| 2013/0287026 A1 | 10/2013 | Davie |
| 2013/0301425 A1 | 11/2013 | Udutha et al. |
| 2013/0301501 A1 | 11/2013 | Olvera-Hernandez et al. |
| 2013/0301646 A1 | 11/2013 | Bogdanski et al. |
| 2013/0308641 A1 | 11/2013 | Ackley |
| 2014/0006354 A1 | 1/2014 | Parkison et al. |
| 2014/0006357 A1 | 1/2014 | Davis et al. |
| 2014/0006465 A1 | 1/2014 | Davis et al. |
| 2014/0007239 A1 | 1/2014 | Sharpe et al. |
| 2014/0064104 A1 | 3/2014 | Nataraja et al. |
| 2014/0075002 A1 | 3/2014 | Pradhan et al. |
| 2014/0136908 A1 | 5/2014 | Maggiari et al. |
| 2014/0146817 A1 | 5/2014 | Zhang |
| 2014/0169365 A1 | 6/2014 | Sundaram et al. |
| 2014/0172740 A1 | 6/2014 | McCormick et al. |
| 2014/0201218 A1 | 7/2014 | Catalano et al. |
| 2014/0208150 A1 | 7/2014 | Abuelsaad et al. |
| 2014/0211661 A1 | 7/2014 | Gorkemli et al. |
| 2014/0241356 A1 | 8/2014 | Zhang et al. |
| 2014/0250220 A1 | 9/2014 | Kapadia et al. |
| 2014/0269435 A1 | 9/2014 | McConnell et al. |
| 2014/0301391 A1 | 10/2014 | Krishnan et al. |
| 2014/0304355 A1 | 10/2014 | Kamath et al. |
| 2014/0307744 A1 | 10/2014 | Dunbar et al. |
| 2014/0337500 A1 | 11/2014 | Lee |
| 2014/0351396 A1 | 11/2014 | Stabile et al. |
| 2015/0009797 A1 | 1/2015 | Koponen et al. |
| 2015/0010012 A1 | 1/2015 | Koponen et al. |
| 2015/0016276 A1 | 1/2015 | Decusatis et al. |
| 2015/0063364 A1 | 3/2015 | Thakkar et al. |
| 2015/0085862 A1 | 3/2015 | Song |
| 2015/0100704 A1 | 4/2015 | Davie et al. |
| 2015/0103842 A1 | 4/2015 | Chandrashekhar et al. |
| 2015/0103843 A1 | 4/2015 | Chandrashekhar et al. |
| 2015/0106804 A1 | 4/2015 | Chandrashekhar et al. |
| 2015/0117256 A1 | 4/2015 | Sabaa et al. |
| 2015/0154330 A1 | 6/2015 | Yachide et al. |
| 2015/0229641 A1 | 8/2015 | Sun et al. |
| 2015/0234668 A1 | 8/2015 | Ravinoothala et al. |
| 2015/0237014 A1 | 8/2015 | Bansal et al. |
| 2015/0263946 A1 | 9/2015 | Tubaltsev et al. |
| 2015/0264135 A1 | 9/2015 | Kandula et al. |
| 2015/0312274 A1 | 10/2015 | Bishop et al. |
| 2015/0312326 A1 | 10/2015 | Archer et al. |
| 2015/0326467 A1 | 11/2015 | Fullbright et al. |
| 2015/0381494 A1 | 12/2015 | Cherian et al. |
| 2016/0057014 A1 | 2/2016 | Thakkar et al. |
| 2016/0094396 A1 | 3/2016 | Chandrashekhar et al. |
| 2016/0094661 A1 | 3/2016 | Jain et al. |
| 2016/0134528 A1 | 5/2016 | Lin et al. |
| 2016/0210209 A1 | 7/2016 | Verkaik et al. |
| 2016/0226700 A1 | 8/2016 | Zhang et al. |
| 2016/0226762 A1 | 8/2016 | Zhang et al. |
| 2016/0226822 A1 | 8/2016 | Zhang et al. |
| 2016/0226959 A1 | 8/2016 | Zhang et al. |
| 2016/0226967 A1 | 8/2016 | Zhang et al. |
| 2016/0277289 A1 | 9/2016 | Madabushi et al. |
| 2016/0352588 A1 | 12/2016 | Subbarayan et al. |
| 2016/0373530 A1 | 12/2016 | Duda |
| 2016/0380815 A1 | 12/2016 | Agarwal et al. |
| 2016/0380891 A1 | 12/2016 | Agarwal et al. |
| 2016/0380925 A1 | 12/2016 | Agarwal et al. |
| 2016/0380973 A1 | 12/2016 | Sullenberger et al. |
| 2017/0005988 A1 | 1/2017 | Bansal et al. |
| 2017/0034052 A1 | 2/2017 | Chanda et al. |
| 2017/0034129 A1 | 2/2017 | Sawant et al. |
| 2017/0041347 A1 | 2/2017 | Nagaratnam et al. |
| 2017/0048110 A1 | 2/2017 | Wu et al. |
| 2017/0048130 A1 | 2/2017 | Goliya et al. |
| 2017/0063633 A1 | 3/2017 | Goliya et al. |
| 2017/0063794 A1 | 3/2017 | Jain et al. |
| 2017/0063822 A1 | 3/2017 | Jain et al. |
| 2017/0093617 A1 | 3/2017 | Chanda et al. |
| 2017/0093636 A1 | 3/2017 | Chanda et al. |
| 2017/0104720 A1 | 4/2017 | Bansal et al. |
| 2017/0126431 A1 | 5/2017 | Han et al. |
| 2017/0126551 A1 | 5/2017 | Pfaff et al. |
| 2017/0163442 A1 | 6/2017 | Shen et al. |
| 2017/0163532 A1 | 6/2017 | Tubaltsev et al. |
| 2017/0163598 A1 | 6/2017 | Shen et al. |
| 2017/0163599 A1 | 6/2017 | Shen et al. |
| 2017/0171055 A1 | 6/2017 | Wang et al. |
| 2017/0249195 A1 | 8/2017 | Sadana et al. |
| 2017/0250912 A1 | 8/2017 | Chu et al. |
| 2017/0264483 A1 | 9/2017 | Lambeth et al. |
| 2017/0288955 A1* | 10/2017 | Yin .................... H04L 43/0817 |
| 2017/0288981 A1 | 10/2017 | Hong et al. |
| 2017/0289033 A1 | 10/2017 | Singh et al. |
| 2017/0302531 A1 | 10/2017 | Maes |
| 2017/0310641 A1 | 10/2017 | Jiang et al. |
| 2017/0317954 A1 | 11/2017 | Masurekar et al. |
| 2017/0317969 A1 | 11/2017 | Masurekar et al. |
| 2017/0317971 A1 | 11/2017 | Dubey et al. |
| 2017/0318113 A1 | 11/2017 | Ganichev et al. |
| 2017/0324645 A1 | 11/2017 | Johnsen et al. |
| 2017/0331711 A1 | 11/2017 | Duda |
| 2017/0344444 A1 | 11/2017 | Costa-Roberts et al. |
| 2018/0062880 A1 | 3/2018 | Yu et al. |
| 2018/0062881 A1 | 3/2018 | Chandrashekhar et al. |
| 2018/0062923 A1 | 3/2018 | Katrekar et al. |
| 2018/0062944 A1 | 3/2018 | Altman et al. |
| 2018/0063036 A1 | 3/2018 | Chandrashekhar et al. |
| 2018/0063195 A1 | 3/2018 | Nimmagadda et al. |

(56) References Cited

U.S. PATENT DOCUMENTS

| | | |
|---|---|---|
| 2018/0083835 A1 | 3/2018 | Cole et al. |
| 2018/0123877 A1 | 5/2018 | Saxena et al. |
| 2018/0123903 A1 | 5/2018 | Holla et al. |
| 2018/0123919 A1* | 5/2018 | Naous .................. G06F 11/3048 |
| 2018/0157537 A1 | 6/2018 | Chen et al. |
| 2018/0191682 A1 | 7/2018 | Liu et al. |
| 2018/0234337 A1 | 8/2018 | Goliya et al. |
| 2018/0234459 A1 | 8/2018 | Kung et al. |
| 2018/0309718 A1 | 10/2018 | Zuo |
| 2018/0367363 A1* | 12/2018 | Jaeger .................... H04L 41/02 |
| 2018/0373961 A1 | 12/2018 | Wang et al. |
| 2019/0014040 A1 | 1/2019 | Yerrapureddy et al. |
| 2019/0069335 A1 | 2/2019 | Wu |
| 2019/0109669 A1 | 4/2019 | Zachman et al. |
| 2019/0146708 A1* | 5/2019 | Casmira .................. G06F 3/064 |
| | | 711/103 |
| 2019/0158537 A1 | 5/2019 | Miriyala |
| 2019/0182101 A1* | 6/2019 | Kulshreshtha ...... H04L 41/0631 |
| 2019/0190780 A1 | 6/2019 | Wang et al. |
| 2019/0207847 A1 | 7/2019 | Agarwal et al. |
| 2019/0245888 A1 | 8/2019 | Martinez et al. |
| 2019/0260610 A1 | 8/2019 | Dubey et al. |
| 2019/0260630 A1 | 8/2019 | Stabile et al. |
| 2019/0297114 A1 | 9/2019 | Panchalingam et al. |
| 2019/0303326 A1 | 10/2019 | Desai et al. |
| 2019/0334765 A1 | 10/2019 | Jain et al. |
| 2019/0342175 A1 | 11/2019 | Wan et al. |
| 2019/0363975 A1 | 11/2019 | Djernaes |
| 2019/0379731 A1 | 12/2019 | Johnsen et al. |
| 2020/0007392 A1 | 1/2020 | Goyal |
| 2020/0007582 A1 | 1/2020 | Dixit et al. |
| 2020/0007584 A1 | 1/2020 | Dixit et al. |
| 2020/0014662 A1 | 1/2020 | Chanda et al. |
| 2020/0021541 A1 | 1/2020 | Chanda |
| 2020/0042365 A1* | 2/2020 | Tanna ...................... G06F 9/465 |
| 2020/0057669 A1 | 2/2020 | Hutcheson et al. |
| 2020/0076684 A1 | 3/2020 | Naveen et al. |
| 2020/0106744 A1 | 4/2020 | Miriyala et al. |
| 2020/0162325 A1 | 5/2020 | Desai et al. |
| 2020/0162337 A1 | 5/2020 | Jain et al. |
| 2020/0169496 A1 | 5/2020 | Goliya et al. |
| 2020/0195607 A1 | 6/2020 | Wang et al. |
| 2020/0250009 A1* | 8/2020 | Jaeger .................... H04L 63/20 |
| 2020/0257549 A1 | 8/2020 | Maznev et al. |
| 2020/0296035 A1 | 9/2020 | Agarwal et al. |
| 2020/0304427 A1 | 9/2020 | Sandler et al. |
| 2020/0344626 A1* | 10/2020 | Lewis .................. H04W 24/10 |
| 2020/0348984 A1* | 11/2020 | Giannetti .............. G06F 9/5072 |
| 2020/0358693 A1 | 11/2020 | Rawlins |
| 2020/0366741 A1 | 11/2020 | Kancherla et al. |
| 2020/0409563 A1 | 12/2020 | Parasnis et al. |
| 2021/0019194 A1* | 1/2021 | Bahl .................... H04L 67/1031 |
| 2021/0036889 A1 | 2/2021 | Jain et al. |
| 2021/0067556 A1 | 3/2021 | Tahan |
| 2021/0111992 A1* | 4/2021 | Nainar .................... H04L 43/12 |
| 2021/0117908 A1 | 4/2021 | Coles et al. |
| 2021/0126641 A1 | 4/2021 | Yan et al. |
| 2021/0144517 A1* | 5/2021 | Guim Bernat ...... H04L 41/0869 |
| 2021/0168197 A1 | 6/2021 | Jones et al. |
| 2021/0182280 A1* | 6/2021 | Picard ................. G06F 16/2282 |
| 2021/0194729 A1 | 6/2021 | Semwal et al. |
| 2021/0218652 A1* | 7/2021 | Raut ........................ H04L 45/64 |
| 2021/0279157 A1* | 9/2021 | Woo ....................... G06F 11/302 |
| 2021/0311758 A1* | 10/2021 | Cao .......................... G06F 8/70 |
| 2021/0311764 A1* | 10/2021 | Rosoff ..................... G06F 9/54 |
| 2021/0311765 A1* | 10/2021 | Subramanian ....... G06F 9/45558 |
| 2021/0311960 A1 | 10/2021 | Rogozinsky et al. |
| 2021/0314192 A1 | 10/2021 | Chandrashekhar et al. |
| 2021/0314193 A1 | 10/2021 | Chandrashekhar et al. |
| 2021/0314212 A1 | 10/2021 | Chandrashekhar et al. |
| 2021/0314215 A1 | 10/2021 | Manzanilla et al. |
| 2021/0314219 A1 | 10/2021 | Gujar et al. |
| 2021/0314225 A1 | 10/2021 | Chandrashekhar et al. |
| 2021/0314226 A1 | 10/2021 | Chandrashekhar et al. |
| 2021/0314227 A1 | 10/2021 | Chandrashekhar et al. |
| 2021/0314228 A1 | 10/2021 | Chandrashekhar et al. |
| 2021/0314235 A1 | 10/2021 | Chandrashekhar et al. |
| 2021/0314251 A1 | 10/2021 | Dubey et al. |
| 2021/0314256 A1 | 10/2021 | Chandrashekhar et al. |
| 2021/0314257 A1 | 10/2021 | Chandrashekhar et al. |
| 2021/0314258 A1 | 10/2021 | Chandrashekhar et al. |
| 2021/0314289 A1 | 10/2021 | Chandrashekhar et al. |
| 2021/0314291 A1 | 10/2021 | Chandrashekhar et al. |
| 2021/0367834 A1 | 11/2021 | Palavalli et al. |
| 2021/0392042 A1* | 12/2021 | Cahyadi .............. H04L 12/4641 |
| 2022/0103429 A1 | 3/2022 | Vaidya et al. |
| 2022/0103430 A1 | 3/2022 | Vaidya et al. |
| 2022/0103514 A1 | 3/2022 | Vaidya et al. |
| 2022/0103521 A1 | 3/2022 | Vaidya et al. |
| 2022/0103598 A1 | 3/2022 | Vaidya et al. |
| 2022/0158926 A1* | 5/2022 | Wennerström .......... H04L 43/50 |
| 2022/0191126 A1 | 6/2022 | Dubey et al. |
| 2022/0222117 A1* | 7/2022 | Kutch .................... G06F 9/5005 |
| 2022/0239503 A1* | 7/2022 | Mallikarjuna Durga Lokanath .... |
| | | H04L 9/0891 |
| 2022/0255896 A1 | 8/2022 | Jain et al. |
| 2023/0148158 A1* | 5/2023 | Bandarupalli ...... H04L 67/1008 |
| | | 709/224 |
| 2023/0269149 A1* | 8/2023 | Huang .................. H04L 63/062 |
| | | 709/224 |
| 2023/0305944 A1* | 9/2023 | Biswas ............... G06F 11/3612 |

FOREIGN PATENT DOCUMENTS

| | | |
|---|---|---|
| CN | 102986172 A | 3/2013 |
| CN | 103650433 A | 3/2014 |
| CN | 103890751 A | 6/2014 |
| CN | 110061899 A | 7/2019 |
| EP | 1154601 A1 | 11/2001 |
| EP | 1290856 A2 | 3/2003 |
| EP | 1635506 A1 | 3/2006 |
| EP | 1868318 A1 | 12/2007 |
| EP | 3016331 A1 | 5/2016 |
| EP | 3485610 A1 | 5/2019 |
| WO | 2010028364 A1 | 3/2010 |
| WO | 2011140028 A1 | 11/2011 |
| WO | 2012113444 A1 | 8/2012 |
| WO | 2013026049 A1 | 2/2013 |
| WO | 2013152716 A1 | 10/2013 |
| WO | 2015054671 A2 | 4/2015 |
| WO | 2017003881 A1 | 1/2017 |
| WO | 2018044341 A1 | 3/2018 |
| WO | 2021206785 A1 | 10/2021 |
| WO | 2021206786 A1 | 10/2021 |
| WO | 2021206790 A1 | 10/2021 |
| WO | 2022066269 A1 | 3/2022 |

OTHER PUBLICATIONS

Author Unknown, "Apache Cassandra™ 1.2 Documentation," Jan. 13, 2013, 201 pages, DataStax.

Author Unknown, "OpenFlow Switch Specification, Version 1.1.0 Implemented (Wire Protocol 0x02)," Feb. 28, 2011, 56 pages, Open Networking Foundation.

Berde, Pankaj, et al., "ONOS Open Network Operating System An Open-Source Distributed SDN OS," Dec. 19, 2013, 34 pages.

Das, Saurav, et al., "Simple Unified Control for Packet and Circuit Networks," Month Unknown 2009, 2 pages, IEEE.

Das, Saurav, et al., "Unifying Packet and Circuit Switched Networks with OpenFlow," Dec. 7, 2009, 10 pages, available at http://OpenFlowSwitch.org/downloads/technicalreports/openflow-tr-2009-4-unification.pdf.

Giannakou, Anna, et al., "AL-SAFE: A Secure Self-Adaptable Application-Level Firewall for IaaS Clouds," 2016 IEEE 8th International Conference on Cloud Computing Technology and Science, Dec. 12-15, 2016, 8 pages, IEEE, Luxembourg City, LU.

Guo, Yingya, et al., "Traffic Engineering in SDN/OSPF Hybrid Network," The 22nd IEEE International Conference on Network Protocols (ICNP 2014), Oct. 21-24, 2014, 6 pages, IEEE, The Research Triangle, North Carolina, USA.

(56) References Cited

OTHER PUBLICATIONS

Hanna, Jeremy, "How ZooKeeper Handles Failure Scenarios," http://.apache.org/hadoop/Zookeeper/FailureScenarios. Dec. 9, 2010, 1 page.
Heller, Brandon, et al., "The Controller Placement Problem," Hot Topics in Software Defined Networks, Aug. 13, 2012, 6 pages, Helsinki, Finland.
Jin, Xin, et al., "Dynamic Scheduling of Network Updates," SIGCOMM'14, Aug. 17-22, 2014, 12 pages, ACM, Chicago, IL, USA.
Kohila, N., et al., "Data Security in Local Network Using Distributed Firewall," International Journal of Scientific Research in Computer Science Applications and Management Studies, Nov. 2014, 8 pages, vol. 3, Issue 6, jsrcams.com.
Krishnaswamy, Umesh, et al., "ONOS Open Network Operating System—An Experimental Open-Source Distributed SDN OS," Apr. 16, 2013, 24 pages.
Lebresne, Sylvain, "[Release] Apache Cassandra 1.2 released," Jan. 2, 2013, 1 page.
Loshin, Peter, et al., "What is a data center?," Special Report: Everything You Need to Know About the Log4j Vulnerability, Oct. 2021, 13 pages, retrieved from https://searchdatacenter.techtarget.com/definition/data-center.
Mahalingham, Mallik, et al., "VXLAN: A Framework for Overlaying Virtualized Layer 2 Networks over Layer 3 Networks," draft-mahalingham-dutt-dcops-vxlan-02.txt Internet Draft, Aug. 22, 2012, 20 pages, Internet Engineering Task Force.
Mahalingham, Mallik, et al., "VXLAN: A Framework for Overlaying Virtualized Layer 2 Networks over Layer 3 Networks," draft-mahalingham-dutt-dcops-vxlan-00.txt Internet Draft, Aug. 26, 2011, 20 pages, Internet Engineering Task Force.
McKeown, Nick, et al., "OpenFlow: Enabling Innovation in Campus Networks," ACM SIGCOMM Computer Communication Review, Apr. 2008, 6 pages, vol. 38, No. 2, ACM.
Non-Published Commonly Owned U.S. Appl. No. 17/869,637, filed Jul. 20, 2022, 38 pages, VMware, Inc.
Non-Published Commonly Owned U.S. Appl. No. 17/869,640, filed Jul. 20, 2022, 37 pages, VMware, Inc.
Non-Published Commonly Owned U.S. Appl. No. 18/118,685, filed Mar. 7, 2023, 43 pages, VMware, Inc.
Non-Published Commonly Owned U.S. Appl. No. 18/118,687, filed Mar. 7, 2023, 43 pages, VMware, Inc.
Non-Published Commonly Owned U.S. Appl. No. 18/195,825, filed May 10, 2023, 115 pages, VMware, Inc.
Non-Published Commonly Owned U.S. Appl. No. 18/195,826, filed May 10, 2023, 114 pages, VMware, Inc.
Non-Published Commonly Owned U.S. Appl. No. 18/195,827, filed May 10, 2023, 114 pages, VMware, Inc.
Non-Published Commonly Owned U.S. Appl. No. 18/195,829, filed May 10, 2023, 114 pages, VMware, Inc.
Non-Published Commonly Owned U.S. Appl. No. 18/195,834, filed May 10, 2023, 114 pages, VMware, Inc.
Non-Published Commonly Owned U.S. Appl. No. 18/195,835, filed May 10, 2023, 114 pages, VMware, Inc.
Non-Published Commonly Owned U.S. Appl. No. 18/195,836, filed May 10, 2023, 114 pages, VMware, Inc.
Non-Published Commonly Owned U.S. Appl. No. 18/195,838, filed May 10, 2023, 113 pages, VMware, Inc.
Non-Published Commonly Owned U.S. Appl. No. 18/195,839, filed May 10, 2023, 114 pages, VMware, Inc.
Non-Published Commonly Owned U.S. Appl. No. 18/195,841, filed May 10, 2023, 115 pages, VMware, Inc.
Non-Published Commonly Owned Related U.S. Appl. No. 18/195,850 with similar specification, filed May 10, 2023, 50 pages, VMware, Inc.
Non-Published Commonly Owned Related U.S. Appl. No. 18/195,851 with similar specification, filed May 10, 2023, 51 pages, VMware, Inc.
Non-Published Commonly Owned U.S. Appl. No. 18/227,655, filed Jul. 28, 2023, 133 pages, VMware, Inc.
Non-Published Commonly Owned U.S. Appl. No. 18/231,756, filed Aug. 8, 2023, 57 pages, VMware, Inc.
Non-Published Commonly Owned U.S. Appl. No. 18/231,757, filed Aug. 8, 2023, 57 pages, VMware, Inc.
Non-Published Commonly Owned U.S. Appl. No. 18/231,759, filed Aug. 8, 2023, 57 pages, VMware, Inc.
Schuba, Christoph, et al., "Integrated Network Service Processing Using Programmable Network Devices," SMLI TR-2005-138, May 2005, 30 pages, Sun Microsystems, Inc.
Sherwood, Rob, et al., "FlowVisor: A Network Virtualization Layer," Oct. 14, 2009, 15 pages, OPENFLOW-TR-2009-1.
Surantha, Nico, et al., "Secure Kubernetes Networking Design Based on Zero Trust Model: A Case Study of Financial Service Enterprise in Indonesia," Innovative Mobile and Internet Services in Ubiquitous Computing, Jan. 2020, 14 pages, Springer Nature, Switzerland.
Wack, John, et al., "Guidelines on Firewalls and Firewall Policy," Recommendations of the National Institute of Standards and Technology, Special Publication 800-41, Jan. 2002, 75 pages, NIST, Gaithersburg, MD, USA.

\* cited by examiner

Health Monitor Configuration

```
health:
  periodic: 30
  debug: true
  services:
    "gm-policy":
      url: 'https://policy.mgmt.com/policy-instance-1/global-manager/api/v1/health'
      generate_alarm: true
      cert: true
      replicas: true
      service_mode: false
    "corfu":
      url: 'http://policy.mgmt.com/policy-instance-1/corfu/api/v1/health'
      generate_alarm: false
      cert: false
      replicas: true
      service_mode: false
    "asynchronous-replication":
      url: 'https://policy.mgmt.com/policy-instance-1/async-replicator/api/v1/health'
      generate_alarm: true
      cert: true
      replicas: true
      service_mode: false
    "site-manager":
      url: 'https://policy.mgmt.com/policy-instance-1/site-manager/api/v1/health'
      generate_alarm: false
      cert: true
      replicas: true
      service_mode: false
    "api":
      url: 'https://policy.mgmt.com/policy-instance-1/api/api/v1/health'
      generate_alarm: true
      cert: true
      replicas: true
      service_mode: false
```

*Figure 5*

Policy Service Health Output

```
"consolidated status": 0
"reason": "several aspects failed"
"basic": {
  "init": {
    "status": 1,
    "reason": "initialization successful"
  },
  "intent": {
    "status": 1,
    "reason": "up and running"
  },
  "provider": {
    "status": 1,
    "reason": "up and running"
  }
}
"runtime": {
  "search component": {
    "status": 0,
    "reason": "search component failure"
  },
  "ar component": {
    "status": 0,
    "reason": "ar replication failure"
  },
  "Corfu connection": {
    "status": 0,
    "reason": "connect to Corfu failed"
  },
  "sites-discovered": {
    "status": 1,
    "reason": "all sites discovered"
  },
  "message-to-lm": {
    "status": 1,
    "reason": "all messages seen"
  },
```

*Figure 9*

FRAMEWORK FOR PROVIDING HEALTH STATUS DATA

BACKGROUND

Health checking and monitoring are important for maintaining resiliency and ensuring continuous operation of any system. Optimally, health checking services should be able to detect issues within a system as early as possible in order to enable the system to automatically remediate or to notify the administrator and/or developer of the issues for manual remediation. In systems implemented as microservices (e.g., in container clusters), health monitoring has existed to some extent for several years to, e.g., identify when a service has gone down. However, there is a great deal of improvement to be made in this area.

BRIEF SUMMARY

Some embodiments provide a novel framework for monitoring health status for a system that is deployed as a set of services executing across one or more datacenters. Each of the services of the system, in some embodiments, exposes an API for providing health monitoring data in a uniform format to a set of one or more health monitoring services deployed within the system. The uniform format allows each service to report health monitoring data in the uniform format for their own respective set of aspects of the service (e.g., whether various modules of the service are initiated correctly, whether the service can connect to other services, etc.) to a respective health monitoring service.

In some embodiments, the monitored system is implemented within a container cluster (e.g., a Kubernetes cluster) in a public cloud (e.g., across one or more public cloud datacenters). For instance, in some embodiments, the monitored system is a multi-tenant network management system that executes in the public cloud to manage groups of datacenters (e.g., on-premises datacenters, virtual datacenters implemented in the same or other public clouds, etc.) for multiple different tenants. Such a multi-tenant network management system, in some embodiments, includes both (i) a set of common multi-tenant services and (ii) multiple tenant-specific service instances that each perform a specific set of network management operations for a single group of datacenters of a single tenant. For instance, the common multi-tenant services could include a subscription service, a registration service, a deployment service that handles deployment of the tenant-specific service instances, among other services.

In some embodiments, the tenant-specific service instances include policy management service instances, network flow monitoring service instances, load balancing service instances, etc. Each service instance, in some embodiments, manages a single group of datacenters for a single tenant. In other embodiments, a single service instance may manage multiple groups of datacenters (for the same tenant or for different tenants). Depending on the types of services requested by a tenant for a particular group of datacenters, multiple service instances (of different types) may manage a single group of datacenters. Each of the service instances, in some embodiments, is implemented as a set of microservices (e.g., in the same namespace of the container cluster).

To perform health monitoring of such a system, in some embodiments the system deploys (i) a first health monitoring service that monitors the set of common services and (ii) a respective health monitoring service within each of the tenant-specific service instances (e.g., within the namespaces of their respective service instances). The first health monitoring service directly communicates with each of the common services to collect health monitoring data from these common services, while each respective health monitoring service within a respective service instance directly communicates with the various microservices of its respective service instance to collect health monitoring data from the microservices.

In some embodiments, each of the health monitoring services operating within a service instance provides the health monitoring data that it collects to the first health monitoring service. This first health monitoring service stores the health monitoring data that it collects from the common services as well as from the various health monitoring services in the service instances within a unified data store in some embodiments.

As mentioned, in some embodiments the health monitoring data that the health monitoring services collect is formatted in a uniform manner. Each service (e.g., each common service, each microservice of the service instances) is defined to expose a Representational State Transfer (REST) API endpoint to provide health monitoring data about various aspects of the service. Different services provide data about different aspects of the service, but do so in a uniform format (e.g., a uniform JSON format). In some embodiments, these APIs are only exposed internally, so that the API endpoint for a particular service can be contacted by the health monitoring service that monitors that particular service, but not by other entities.

In some embodiments, the different aspects of a service for which the service provides health monitoring data include both "static" and "runtime" aspects. The static aspects of a service relate to initialization of various components of the service that are essential for the service to be running. For instance, bringing up a REST API server, starting certain threads, etc., can be considered static aspects of a service. The runtime aspects of a service are aspects that are runtime-dependent (e.g., that relate to the service performing its runtime operations successfully). These runtime aspects may include connections to other microservices (of the same service instance), databases, or other services (e.g., other service instances or third-party services), the status of a buffer or queue used by the service, etc.

The uniform format of the health monitoring data, in some embodiments, provides (i) a status and (ii) an explanation for the status for each of numerous aspects of the service. In some embodiments, the status is a Boolean value (e.g., 1 for correctly operational and 0 for an indication of a problem) while the explanation is a string. When the status specifies that the particular aspect of the service is operating correctly, the explanation may simply state that the aspect is healthy or is operating correctly. On the other hand, when the status specifies that the particular aspect of the service is not operating correctly, the explanation indicates a reason that the aspect is not correctly operational. In some embodiments, for each aspect of the service, a number of different potential reasons are defined according to different criteria. The explanation provided at any given time is based on which criteria are matched at that time.

In some embodiments, the health monitoring services regularly (e.g., at regular intervals) access the API endpoints of their respective monitored services to collect the health monitoring data. As noted, in some embodiments all of the health monitoring data is stored (e.g., as time series data) in a data store (e.g., a JSON-based document for storing the JSON-formatted health monitoring data).

Such a data store enables a user interface (UI) to query for the health monitoring data and present this data in a useful format to a user (e.g., a network or security administrator). In some embodiments, this UI displays representations of the health status for a set of the services operating in the system. For a system administrator (e.g., an administrator with access to the entire network management system), this may include all of the common services as well as all of the microservices of the tenant-specific service instances. In some embodiments, these different services are organized in groups in the UI, with the administrator able to choose to view only the common services, only the services belonging to a particular service instance or set of service instances for a particular datacenter group, etc. In some embodiments, a tenant user can view the health monitoring data for the services belonging to service instances managing the data for that tenant's datacenter group or groups, but not for any other services in the system. In other embodiments, the health monitoring data is not visible to the tenant users.

The health monitoring data is displayed in the UI of some embodiments as time series data, showing the health status of each service over time (e.g., as a line represented in one color when the service is healthy, a second color when the service is degraded, and a third color when the service is non-operational). In some embodiments, each service is actually replicated across multiple nodes of the container cluster (e.g., in different physical datacenters for redundancy), and the health status of each replica is shown in the UI (as each of the replicas may be polled separately by the health monitoring service or multiple different replicas of the health monitoring service).

Within the UI, the user can select a specific service in some embodiments in order to view the health status of the different aspects for which the service reports health data. When a specific service is selected, the UI displays the health status time series data for each different aspect of the service (e.g., initialization status of different component, connection status to different other services, etc.). As in the UI showing the general health information for multiple services, the service-specific UI displays the health status data for each replica of the service. For a specific service, the UI also provides information about each replica (e.g., information about the node on which the replica is hosted).

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and the Drawings is needed. Moreover, the claimed subject matters are not to be limited by the illustrative details in the Summary, Detailed Description, and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

FIG. 5 conceptually illustrates an example of a declarative configuration file for configuring a health monitoring service for a particular policy manager service instance.

FIG. 9 illustrates an example health status data output for a policy management microservice of a policy manager service instance of some embodiments.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a novel framework for monitoring health status for a system that is deployed as a set of services executing across one or more datacenters. Each of the services of the system, in some embodiments, exposes an API for providing health monitoring data in a uniform format to a set of one or more health monitoring services deployed within the system. The uniform format allows each service to report health monitoring data in the uniform format for their own respective set of aspects of the service (e.g., whether various modules of the service are initiated correctly, whether the service can connect to other services, etc.) to a respective health monitoring service.

In some embodiments, the monitored system is implemented within a container cluster (e.g., a Kubernetes cluster) in a public cloud (e.g., across one or more public cloud datacenters). For instance, in some embodiments, the monitored system is a multi-tenant network management system that executes in the public cloud to manage groups of datacenters (e.g., on-premises datacenters, virtual datacenters implemented in the same or other public clouds, etc.) for multiple different tenants. Such a multi-tenant network management system, in some embodiments, includes both (i) a set of common multi-tenant services and (ii) multiple tenant-specific service instances that each perform a specific set of network management operations for a single group of datacenters of a single tenant. For instance, the common multi-tenant services could include a subscription service, a registration service, a deployment service that handles deployment of the tenant-specific service instances, among other services.

Figure 1:
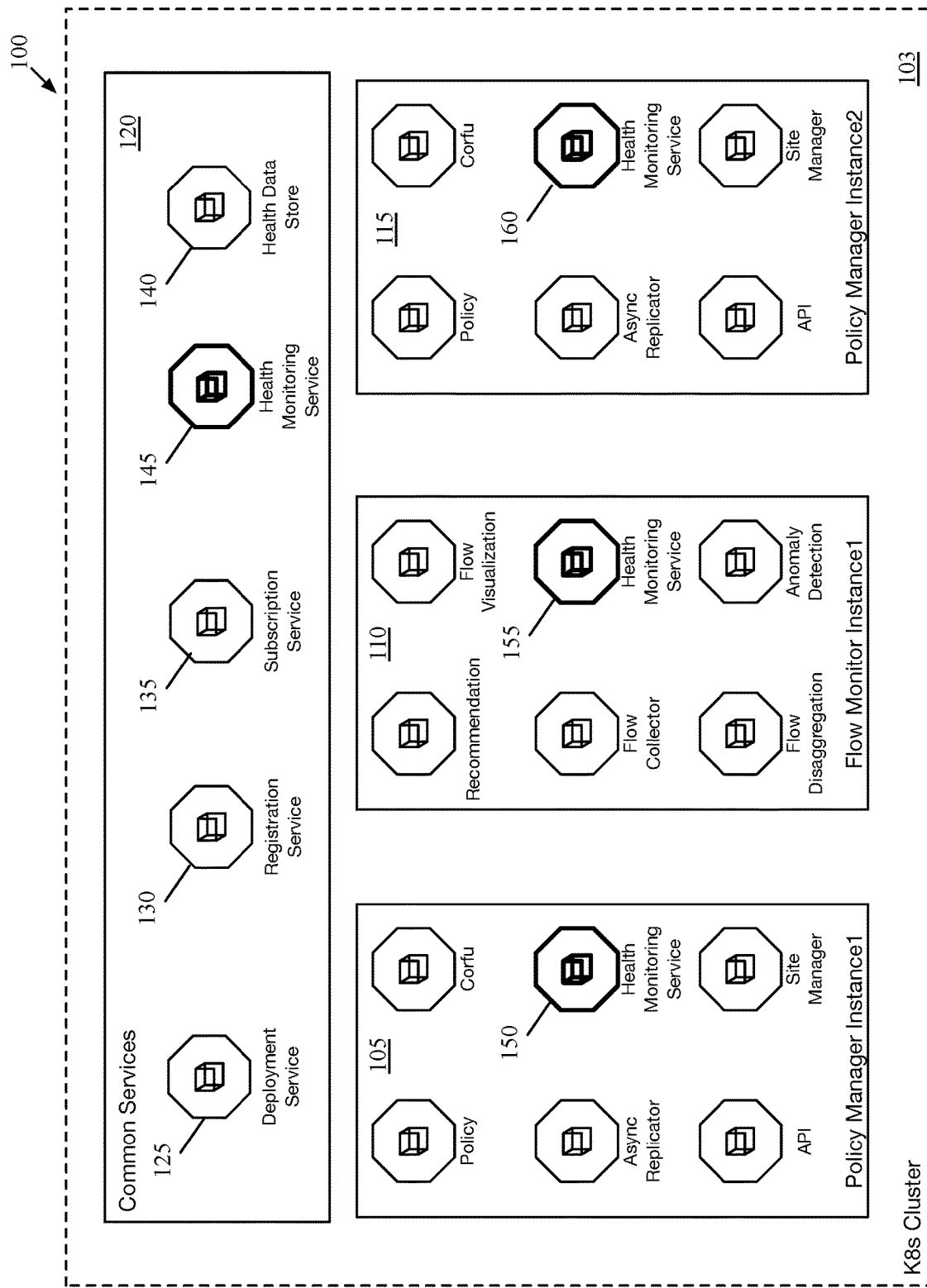
FIG. 1 conceptually illustrates the architecture of a cloud-based multi-tenant network management and monitoring system of some embodiments.

FIG. 1 conceptually illustrates the architecture of such a cloud-based multi-tenant network management and monitoring system 100 (subsequently referred to herein as a network management system) of some embodiments. In some embodiments, the network management system 100 operates in a container cluster (e.g., a Kubernetes cluster 103, as shown). The network management system 100 manages multiple groups of datacenters for multiple different tenants. For each group of datacenters, the tenant to whom that group of datacenters belongs selects a set of network management services for the network management system to provide (e.g., policy management, network flow monitoring, threat monitoring, etc.). In addition, in some embodiments, a given tenant can have multiple datacenter groups (for which the tenant can select to have the network management system provide the same set of services or different sets of services). Additional information regarding these datacenter groups can be found in U.S. Provisional Patent Application No. 63/440,959, which is incorporated herein by reference.

In some embodiments, each network management service for each datacenter group operates as a separate instance in the container cluster 103. In this example, both a policy management service and a network flow monitoring service have been defined for a first datacenter group, and thus the cluster 103 includes a first policy manager instance 105 and a first flow monitor instance 110. In addition, the policy management service has been defined for a second datacenter group and thus the cluster 103 includes a second policy manager instance 115.

The policy management service for a given datacenter group, in some embodiments, allows the user to define a logical network for the datacenter group that connects logical network endpoint data compute nodes (DCNs) (e.g., virtual machines, containers, etc.) operating in the datacenters as well as various policies for that logical network (defining security groups, firewall rules, edge gateway routing policies, etc.). Operations of the policy manager (in a non-cloud-based context) are described in detail in U.S. Pat. Nos. 11,088,919, 11,381,456, and 11,336,556, all of which are incorporated herein by reference. The flow monitoring service, in some embodiments, collects flow and context data from each of the datacenters in its datacenter group, correlates this flow and context information, and provides flow statistics information to the user (administrator) regarding the flows in the datacenters. In some embodiments, the flow monitoring service also generates firewall rule recommendations based on the collected flow information (e.g., using micro-segmentation) and publishes to the datacenters these firewall rules. Operations of the flow monitoring service are described in greater detail in U.S. Pat. No. 11,340,931, which is incorporated herein by reference. It should be understood that, while this example (and the other examples shown in this application) only describe a policy management service and a network flow monitoring service, some embodiments include the option for a user to deploy other services as well (e.g., a threat monitoring service, a metrics service, a load balancer service, etc.).

The network management system 100 as implemented in the container cluster 103 also includes various common (multi-tenant) services 120, as well as cluster controllers (not shown). These common services 120 are services that are part of the network management system but unlike the service instances are not instantiated separately for each different group of datacenters. Rather, the common services 120 interact with all of the tenant users, all of the datacenter groups, and/or all of the service instances. These services do not store data specific to the network policy or network operation for an individual user or datacenter group, but rather handle high-level operations to ensure that the network management services can properly interact with the users and datacenters.

For instance, the deployment service 125, in some embodiments, enables the creation of the various network management service instances 105-115. In some embodiments, the deployment service 125 is a multi-tenant service that is accessed by (or at least used by) all of the tenants of the network management system. Through the deployment service, a tenant can define a datacenter group and specify which network management services should be implemented for the datacenter group. In addition, within a datacenter group, in some embodiments the deployment service 125 allows a tenant to define sub-tenants for the group.

The registration service 130 of some embodiments performs a set of operations for ensuring that physical datacenters can register with the network management service. The registration service 130 also keeps track of all of the different datacenters for each datacenter group, in some embodiments. The subscription service 135 of some embodiments handles subscription operations. The network management system of some embodiments uses a keyless licensing system; in some embodiments, the subscription service 135 swaps out licenses for datacenters that previously used a key-based licensing mechanism for an on-premises network management system. The health data store 140 is a data storage that stores health status data in a specific format; in some embodiments, this health data store 140 is a third-party service (e.g., OpenSearch). It should be understood that the common services 120 illustrated in this figure are not an exhaustive list of the common services of a network management system of some embodiments.

In some embodiments, each of the network management service instances 105-115 of the network management system is implemented as a group of microservices. For instance, in a Kubernetes environment, in some embodiments each of the microservices is implemented in an individual Pod. Each of the network management service instances 105-115 includes multiple microservices that perform different functions for the network management service. For instance, each of the policy manager instances 105 and 115 includes a policy microservice (e.g., for handling the actual policy configuration for the logical network spanning the datacenter group), a Corfu microservice (e.g., a Corfu database service that stores network policy configuration via a log), an asynchronous replication microservice (e.g., for executing asynchronous replication channels that push configuration to each of the datacenters managed by the policy management service), an API microservice (e.g., for handling API requests from users to modify and/or query for policy), and a site manager microservice (e.g., for managing the asynchronous replication channels). The flow monitor instance 110 includes a recommendation microservice (e.g., for generating firewall rule recommendations based on micro-segmentation), a flow collector microservice (for collecting flows from the datacenters in the datacenter group monitored by the flow monitor instance 110), a flow disaggregation microservice (e.g., for de-duplicating and performing other aggregation operations on the collected flows), an anomaly detection microservice (e.g., for analyzing the flows to identify anomalous behavior), and a flow visualization microservice (e.g., for generating a UI visualization of the flows in the datacenters). It should be understood that these are not necessarily exhaustive lists of the microservices that make up the policy management and flow monitoring service instances, as different embodiments may include different numbers and types of microservices.

The common services 120 are also implemented as microservices in the container cluster 103 in some embodiments. As shown in this figure, in some embodiments each of the common services is a microservice that is implemented in a Pod. In some other embodiments, some or all of the common services 120 is a group of microservices (like the service instances 105-115).

To perform health monitoring of such a network management system, in some embodiments the system also deploys (i) a first health monitoring service 145 that monitors the set of common services and (ii) a respective health monitoring service 150-160 within each of the tenant-specific service instances. In some embodiments, the health monitoring service 145 communicates directly with each of the common services 125-140 to collect health status data from these common services. That is, the health monitoring service 145 is configured to communicate with the deployment service 125, the registration service 130, the subscription service 135, and (in some cases) the health data store service 140 to retrieve health status data from these services. Meanwhile, each of the health monitoring services 150-160 is configured to communicate directly with each of the services in its respective service instance to retrieve health status data from these different services. In some embodiments, each of the service instances is assigned a different namespace within the container cluster 103 (with appropriate rules preventing service instances for different datacenter groups from communicating with each other), and the respective health monitoring services 150-160 are assigned to these namespaces so as to be able to communicate internally with the various services that they each monitor.

Figure 2:
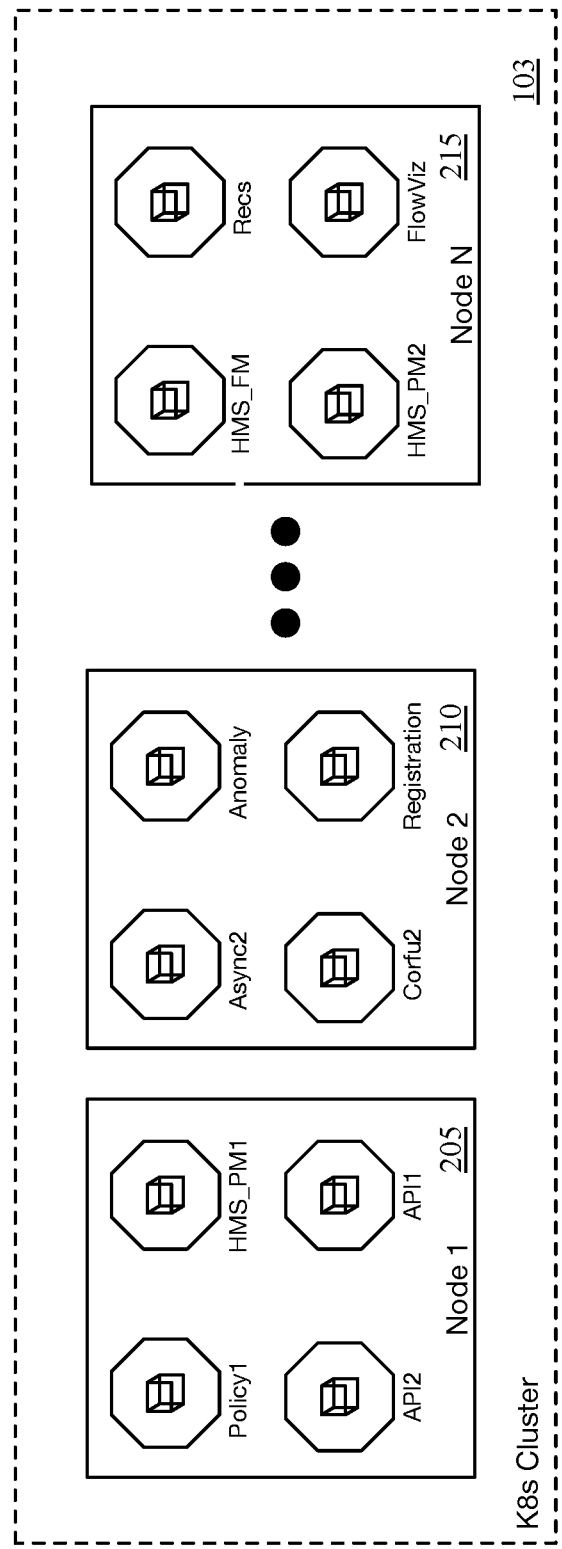
FIG. 2 conceptually illustrates a set of nodes in a container cluster, with various microservices of three service instances distributed across these nodes.

It should be noted that the different microservices within a tenant-specific service instance (as well as the common services) may be placed on various different nodes within the container cluster. FIG. 2 conceptually illustrates a set of nodes 205-215 in the container (Kubernetes) cluster 103, with various microservices of the three service instances 105-115 distributed across these nodes. While this example illustrates four microservices per node, it should be understood that in practice a given node may host many more microservices, and the number of microservices assigned to each node will not necessarily be equal across the nodes.

In some embodiments, each of the nodes 205-215 is a virtual machine (VM) or physical host server that hosts one or more Pods in addition various entities that enable the Pods to run on the node and communicate with other Pods and/or external entities. These various entities, in some embodiments, include a set of networking resources and network management agents, as well as standard Kubernetes agents such as a kubelet for managing the containers operating in the Pods. Each node operates a set of Pods on which the microservices run. Different embodiments assign a single microservice to each Pod or assign multiple microservices (e.g., that are part of the same service instance) to individual Pods.

In some embodiments, the scheduling of microservices to the different nodes 205-215 is controlled by a set of cluster scheduler components (e.g., a Kubernetes scheduler). As such, each of the nodes 205-215 may host a combination of services (including health monitoring services) for various different tenant-specific service instances as well as common services. Thus, for example, the first node 205 hosts two microservices (as well as the health monitoring service) for the first policy manager service instance 105 as well as a single microservice for the second policy manager service instance 115, while the second node 210 hosts two microservices for the second policy manager service instance 115, one common service (the registration service 130), and one microservice for the flow monitoring service instance 110. In some embodiments, the cluster scheduler component takes into account the relatedness of the microservices (i.e., that they belong to the same service instance) when assigning the microservices to nodes, but this is not necessarily dispositive as the scheduler also accounts for other factors. Thus, the health monitoring services may or may not reside on the same nodes as the various services that they monitor.

It should also be noted that the container cluster does not necessarily operate entirely in a single public cloud datacenter. In some embodiments, the cluster is distributed across multiple such public cloud datacenters (e.g., different datacenters of a single public cloud provider). In some such embodiments, the microservices of each service instance are replicated across multiple datacenters or availability zones (e.g., zones within a datacenter). That is, in some embodiments, at least one instance of each microservice executes in each of the availability zones spanned by the cluster.

Figure 3:
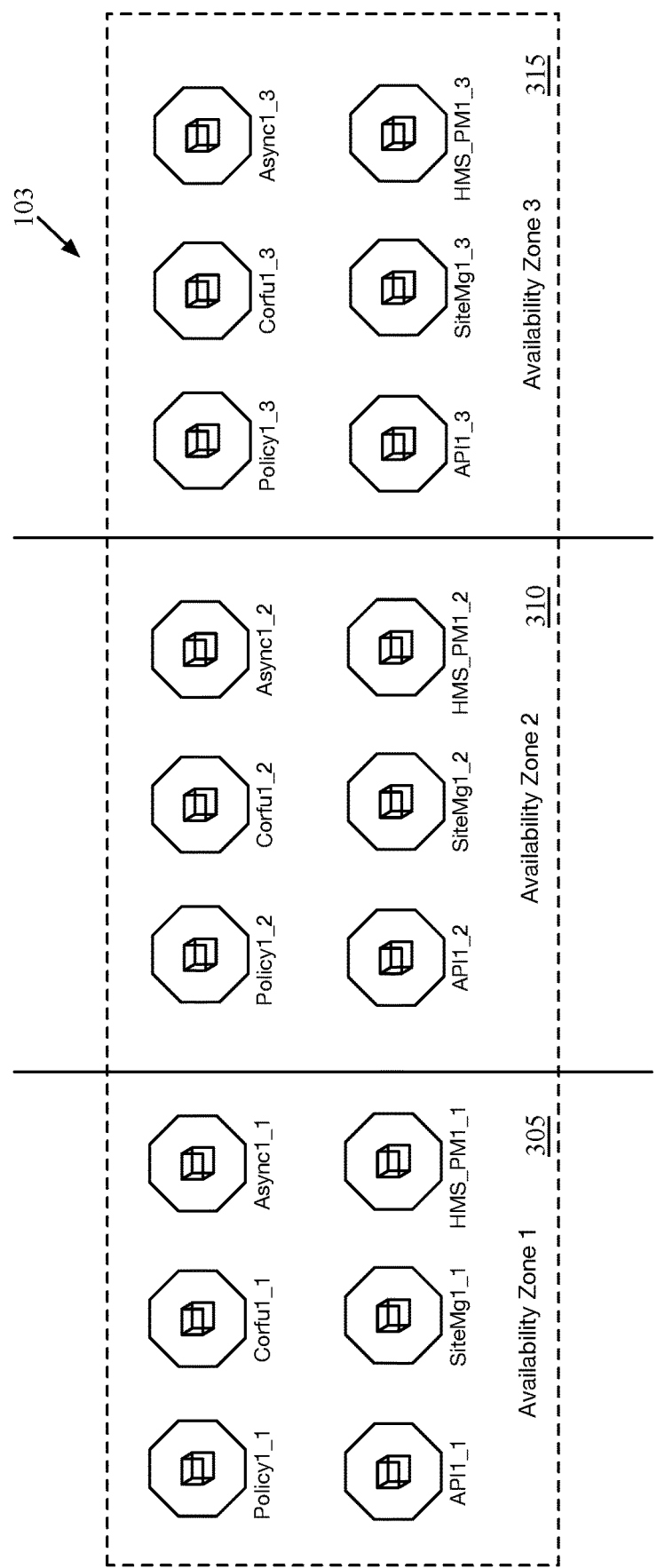
FIG. 3 conceptually illustrates a container cluster with the microservices of a policy manager service instance (including the health monitoring service) replicated across three availability zones.

FIG. 3 conceptually illustrates the container cluster 103 with the microservices of the first policy manager service instance (including the health monitoring service 150) replicated across three availability zones 305-315. In some embodiments, each of these availability zones 305-315 are located at different physical datacenters of the same public cloud provider (and, in some such cases, in the same region as defined by that public cloud provider). The availability zones are typically linked for fast secure connections. By replicating the microservices across multiple availability zones, the network management system is fault-tolerant, so that a failure at one of the public cloud datacenters does not result in failure of the network management system. Some embodiments replicate state data (e.g., the policy configuration database that stores the network policy configuration for a datacenter group) across each of the availability zones. In some embodiments, each of these replicas (e.g., the Pods hosting the replicas) is given a unique name in the different availability zones. In some embodiments, the Corfu microservice is associated with a database and is therefore a stateful set Pod (i.e., a specific type of Pod) with each replica always being assigned the same name each time it is respawned.

In some embodiments, each of the replicas of the health monitoring service monitors the replicas of the other services in their respective availability zone. That is, the replica of health monitoring service 150 in the first availability zone 305 monitors the other microservices of the first policy manager instance 105 in the first availability zone 305, the replica of health monitoring service 150 in the second availability zone 310 monitors the other microservices of the first policy manager instance 105 in the second availability zone 310, and the replica of health monitoring service 150 in the third availability zone 315 monitors the other microservices of the first policy manager instance 105 in the third availability zone 315. In other embodiments, a single health monitoring service operates in one of the availability zones and monitors replicas of the microservices in all of the availability zones. Much of the subsequent discussion will describe singular health monitoring services (for the common services and/or for a tenant-specific service instance); however, it should be noted that in some embodiments these actually represent multiple replicas of the health monitoring services in multiple availability zones.

As noted, each of the health monitoring services of some embodiments collects health status data from a respective set of services. In some embodiments, a first health monitoring service collects health status data from the common services while respective health monitoring services collect health status data from the microservices within each tenant-specific service instance. In some embodiments, each of the health monitoring services operating within a service instance provides the health status data that it collects to the first health monitoring service (i.e., the health monitoring service for the common services). This first health monitoring service stores the health status data that it collects from the common services as well as from the various health monitoring services in the service instances within a unified data store in some embodiments.

Figure 4:
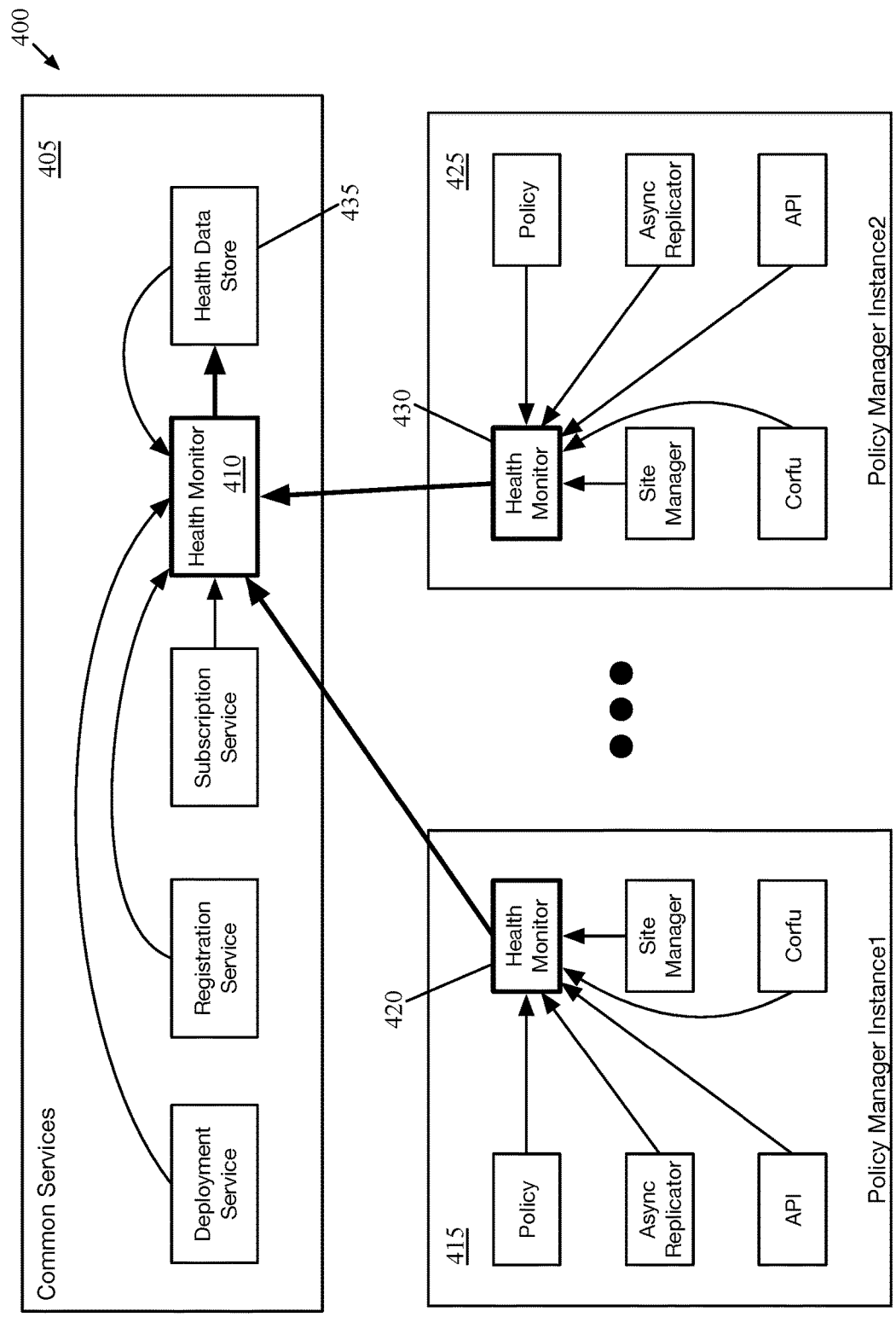
FIG. 4 conceptually illustrates the flow of health status data within a network management system according to some embodiments.

FIG. 4 conceptually illustrates the flow of health status data within a network management system 400 according to some embodiments. As shown, various common services (deployment service, registration service, subscription service, health data store service, and others that are not shown) 405 provide health status data to a first health monitoring service 410. Within a first policy manager service instance 415, the various microservices (policy, asynchronous replication, API, Corfu, and site manager, as well as others that are not shown) provide health status data to the health monitoring service 420 for that service instance. This pattern is repeated in a second policy manager service instance 425 with health monitoring service 430, as well as in any other service instances deployed for the network management system 400.

The health monitoring services 420 and 430 (as well as the health monitoring services for any other service instances) provide their collected health status data to the health monitoring service 410 that monitors the common services. This common health monitoring service 410 stores all of the health status data (i.e., both the data that it collected directly as well as the data from the health monitoring services for the various service instances) in the health data store 435 in some embodiments. It should be noted that in other embodiments the health monitoring services that collect health status data within the tenant-specific service instances write their collected health status data directly to the health data store, rather than providing this data to the health monitoring service for the common services.

It should also be noted that, while the description herein describes a health monitoring service that operates in a multi-tenant system in the cloud, similar health monitoring operations may be performed within a datacenter to monitor the local network management systems. For instance, within a datacenter managed by the multi-tenant network management system, a health monitoring service can execute as part of a local network manager to monitor the health of various operations of the local network manager (e.g., including the operations that connect the local network manager to a policy management service instance of the multi-tenant network management system).

In some embodiments, each of the health monitoring services is deployed along with a configuration file that specifies its health status data collection behavior (e.g., how often the health status data is collected, from which services to collect health status data, and how to collect the health status data from these services). In some embodiments, this configuration file is a declarative file (e.g., a yaml file).

FIG. 5 conceptually illustrates an example of a declarative configuration file 500 for configuring a health monitoring service for a particular policy manager service instance. As shown, the configuration specifies the periodicity of health status data collection (in this case, every 30 seconds), a debugging mode, and a list of services from which to collect the health status data each time period. In this case, these services are the policy service, Corfu (policy database) service, asynchronous replicator, site manager, and API service. In this case, the configuration file 500 specifies five different services of the policy manager service instance to be monitored (it should be understood that in actuality all of the services would be listed).

For each service, a URL is provided as well as (i) whether to generate alarms if status data indicating a problem is received for the service ("generate_alarm") (ii) . . . (iii) whether there are multiple replicas of the service executing in the cluster ("replicas"), and (iv) whether all of the replicas need to be queried or not ("service_mode"). In this case, alarms are generated for some of the service (not for Corfu or the site manager services). A certificate is required for all of the services except for Corfu, because these four services are contacted at https URLs. In addition, all of the services have multiple replicas operating in the cloud and the health monitoring service is configured to contact all of the replicas to retrieve health status data.

The URLs for these services are all in the same namespace ("https://policy.mgmt.com/policy-instance-1"). In some embodiments, each configuration file for a different health monitoring service of a policy manager service instance lists the same services, but with different URLs (i.e., in different namespaces). In some embodiments, the health monitoring service converts these URLs into one or more network addresses of the actual Pods that implement the different services (e.g., multiple IP addresses for multiple replicas) by contacting container cluster components (e.g., a Kubernetes controller). In addition, because the Pods on which the services operate may be removed and/or added, in some embodiments the health monitoring service listens (e.g., to a Kubernetes controller) for any events (e.g., add or delete events) in its namespace in order to identify when these events occur. When a Pod is added or removed for a service, the health monitoring service can re-map its URL for that service to the network address of the new Pod.

Figure 6:
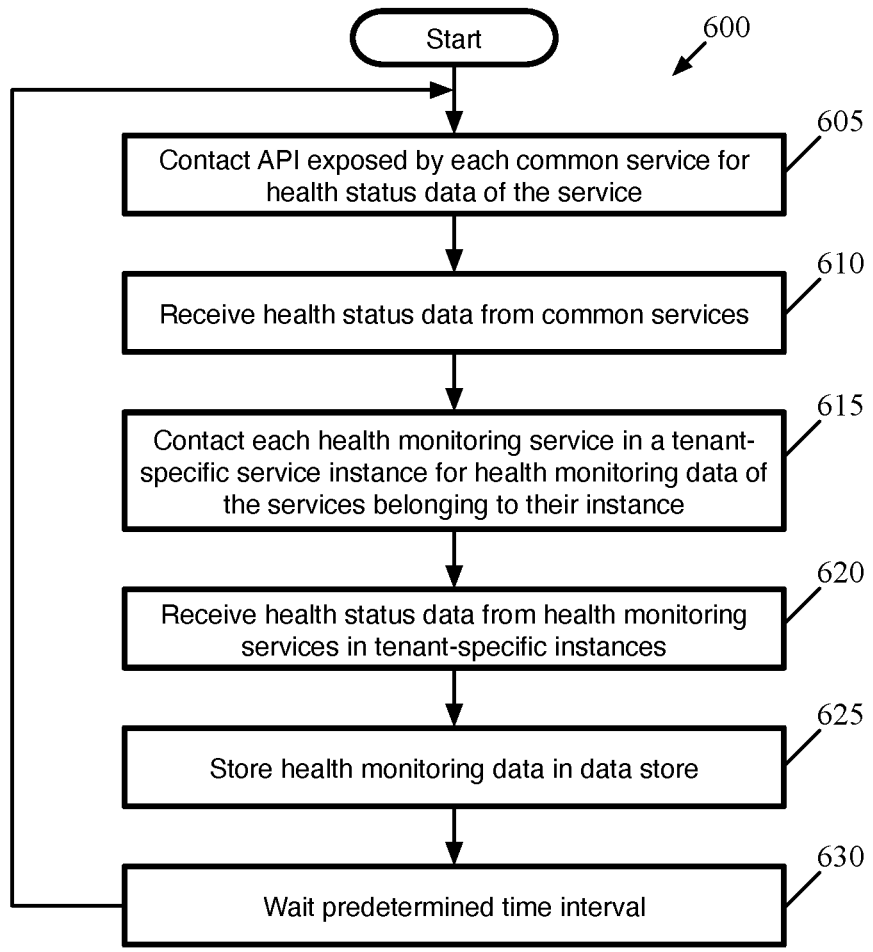
FIG. 6 conceptually illustrates a process of some embodiments to collect health status data and store the health status data in a data store.

FIG. 6 conceptually illustrates a process 600 of some embodiments to collect health status data and store the health status data in a data store. In some embodiments, the process 600 is performed by a health monitoring service that collects health status data from the common services of a network management system such as that described above (in some cases the process 600 is performed by each of multiple replicas of this health monitoring service). In some embodiments, the health monitoring service is configured according to a configuration file similar to that shown in FIG. 5, except that in this case the configuration file specifies all of the common services and how to reach those services.

As shown, the process 600 begins by contacting (at 605) an API exposed by each common service for the health status data of that service. The health monitoring service contacts each of the services specified in its configuration file, as shown in FIG. 5. In some embodiments, each service (e.g., each common service, each microservice of the service instances) is defined to expose a Representational State Transfer (REST) API endpoint to provide health monitoring data about various aspects of the service.

Figure 7:
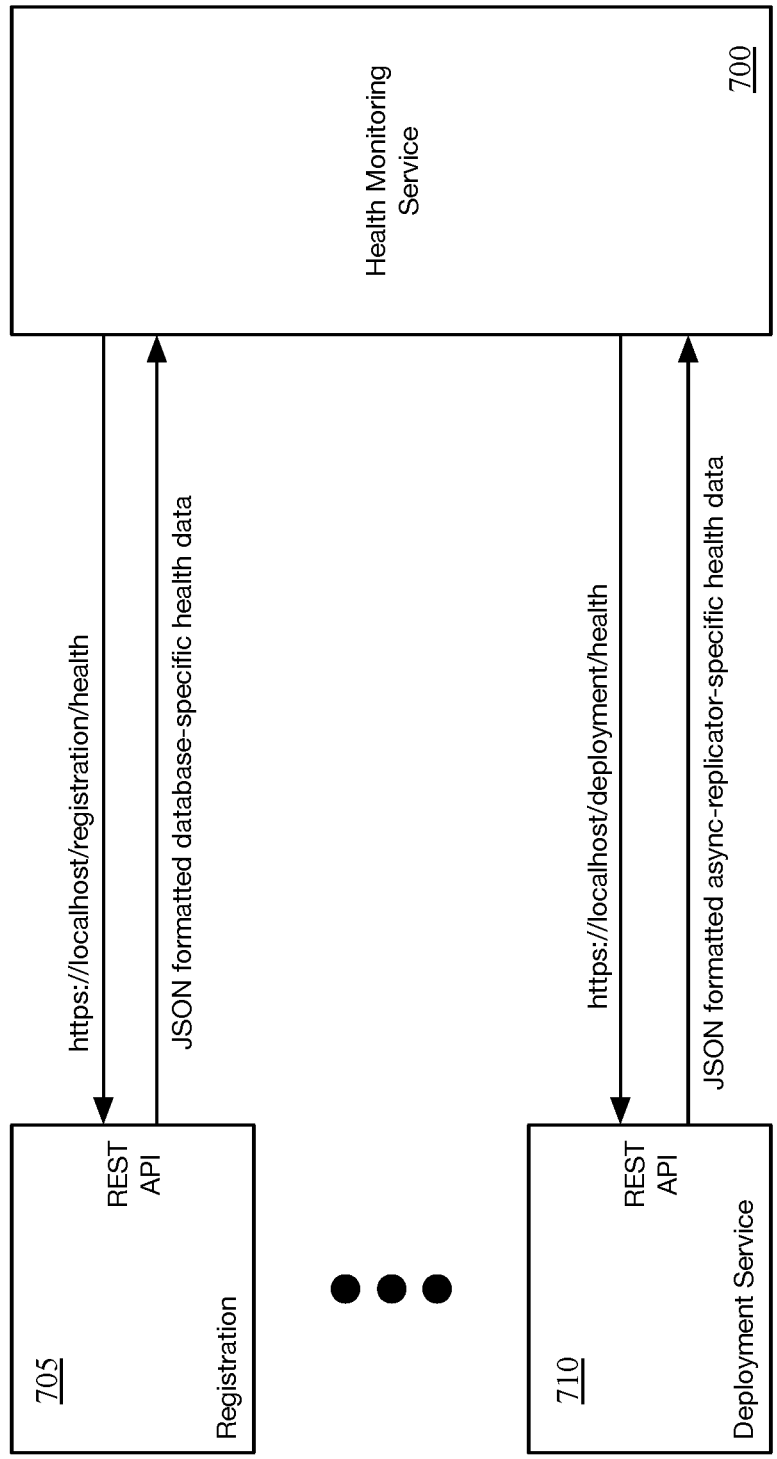
FIG. 7 conceptually illustrates a health monitoring service of some embodiments that contacts REST API endpoints of various common (multi-tenant) services to retrieve health status data from these services.

FIG. 7 conceptually illustrates a health monitoring service 700 of some embodiments that contacts REST API endpoints of various common (multi-tenant) services 705-710 to retrieve health status data from these services. This figure shows a registration service 705 and a deployment service 710, but it should be understood that the various other common services can be contacted in a similar manner by the health monitoring service. As shown, the registration service 705 exposes an API at https://localhost/registration/health and the deployment service 710 similarly exposes an API at https://localhost/deployment/health. In some embodiments, each of these services only exposes the API internally (i.e., API requests cannot come from users, even when authenticated for the network management system). The microservices of a tenant-specific service instance similarly expose REST API endpoints to the health monitoring service within their same namespace in some embodiments.

The process 600 then receives (at 610) health status data from the common services. As described in more detail below, different services provide data about different aspects of the service, doing so in a uniform format. In some embodiments, this uniform format is a JavaScript Object Notation (JSON) format. The health status data is atomized such that for each of a set of defined aspects of a given service, the service provides health information to the health monitoring service each time health information is requested. For each aspect, in some embodiments, the health status data indicates whether the aspect is healthy (e.g., operational) or not (e.g., non-operational). The meaning of a particular aspect being healthy depends on the nature of that aspect of the service (e.g., whether the aspect indicates connectivity to another service, whether a particular routine was properly initialized, etc.).

In addition, the process 600 contacts (at 615) each health monitoring service operating in a tenant-specific service instance to retrieve the health monitoring data of the services belonging to their instance. In some embodiments, as shown in the process 600, the top-level health monitoring service contacts these other health monitoring services on the same timeframe (e.g., with the same periodicity) as it contacts the common services. In other embodiments, the top-level health monitoring service contacts these other health monitoring services on a different timeframe (e.g., less often) to collect their health status data. In some embodiments, the health monitoring services for the tenant-specific service instances are all configured to retrieve health status data from their respective microservices with the same periodicity as the top-level health monitoring service, while in other embodiments these health monitoring services may vary how often they collect health status data.

In response, the process 600 receives (at 620) health status data from the health monitoring services in the tenant-specific service instances. In some embodiments, this data is provided in the same format as the data received directly from the common services, but in larger blocks segregated by service. For instance, in some embodiments the health monitoring services in the service instances append the data for each of their monitored microservices together and provide this as a large block of JSON data to the top-level health monitoring service. In some embodiments, the top-level health monitoring service only retrieves data from the other health monitoring services after several cycles, in which case the other health monitoring services provide several periods of data at once (e.g., segregated by time period).

Having received all of the most recent health status data, the process 600 stores (at 625) this data in the health data store. In some embodiments, the top-level health monitoring service stores the data to a JSON-based document (e.g., an OpenSearch document). This allows for the formatted health status data to be stored as time series data and easily retrieved (e.g., for display of health information in a graphical user interface).

Finally, the process 600 waits (at 630) a predetermined time interval (the time period determined by the configuration file) before returning to 605 to begin the process again. In some embodiments, the process continues so long as the health monitoring service (and the network management system) are operating.

Figure 8:
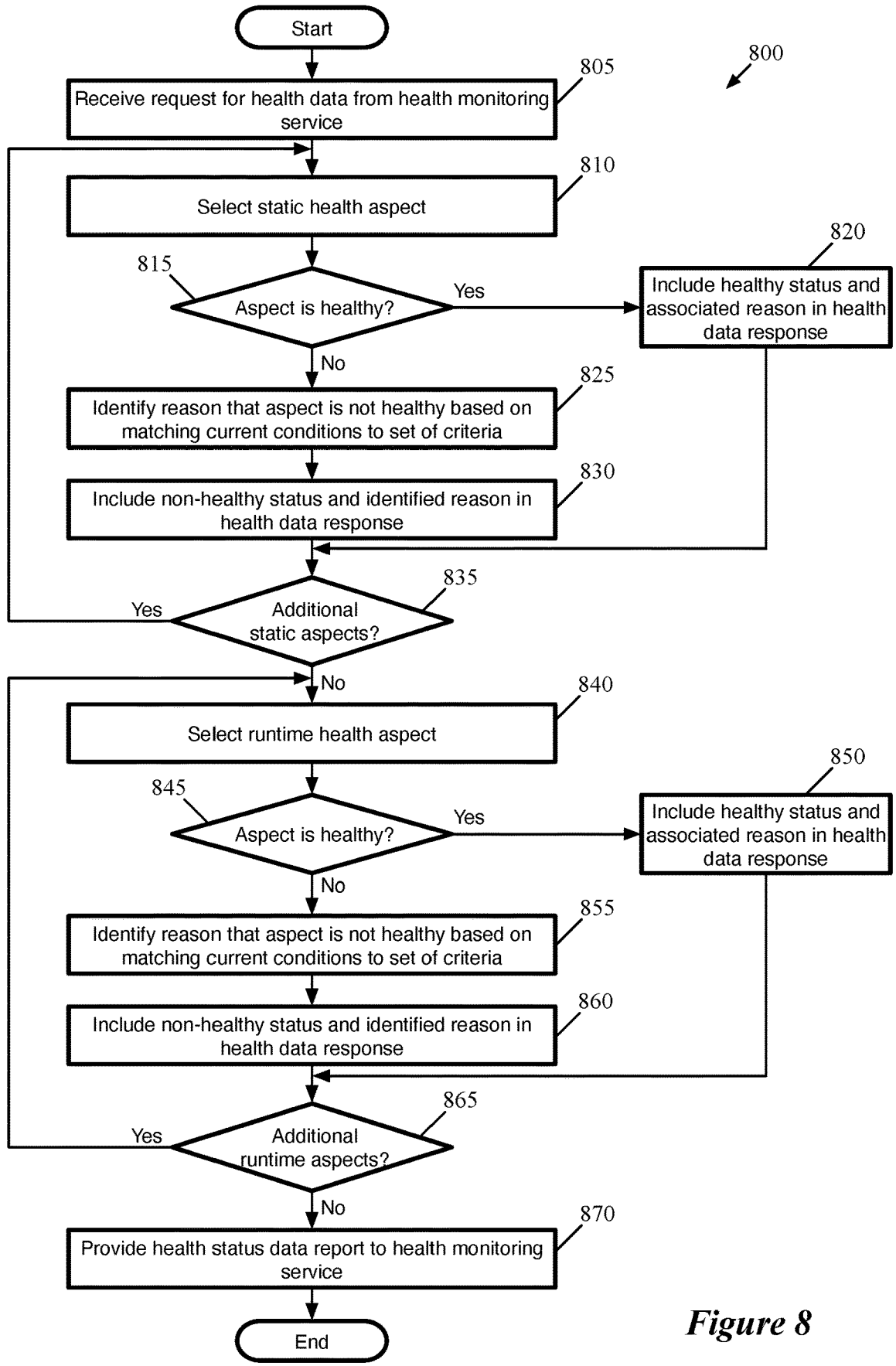
FIG. 8 conceptually illustrates a process of some embodiments for providing health status data to a requesting health monitoring service.

FIG. 8 conceptually illustrates a process 800 of some embodiments for providing health status data to a requesting health monitoring service. The process 800 is performed by any service (e.g., a common service, a microservice within a tenant-specific service instance) operating in a system that is configured to provide its health status data in a uniform format. The process 800 will be described in part by reference to FIG. 9, which illustrates an example health status data output 900 for a particular service (e.g., a policy management microservice of a policy manager service instance).

As shown, the process 800 begins by receiving (at 805) a request for health data from a health monitoring service. In a system such as that shown in FIG. 1, the request is received from the health monitoring service configured to collect health status data from the service performing the process 800. As described above, in some embodiments this request is received as an API request through a REST API endpoint defined for providing formatted health status data.

Next, the process 800 selects (at 810) a static health status aspect. In some embodiments, the different aspects of a service for which the service provides health status data include both "static" (or "basic") and "runtime" aspects. The static aspects of a service relate to initialization of various components of the service that are essential for the service to be running. For instance, bringing up a REST API server, starting certain threads, etc., can be considered static aspects of a service. The runtime aspects of a service are aspects that are runtime-dependent (e.g., that relate to the service performing its runtime operations successfully). These runtime aspects may include connections to other microservices (of the same service instance), databases, or other services (e.g., other service instances or third-party services), the status of a buffer or queue used by the service, etc.

The process 800 then determines (at 815) whether the selected health aspect is currently healthy. In some embodiments, the static health aspects do not change over time (e.g., once a thread is started, the health aspect for that thread having been initiated is always marked as healthy). In other embodiments, the aspect can vary over time (e.g., if the aspect indicates whether a thread is currently running).

As mentioned, in some embodiments the health monitoring data that the health monitoring services collect is formatted in a uniform manner. The uniform format of the health monitoring data, in some embodiments, provides (i) a status and (ii) an explanation for the status for each of numerous aspects of the service. In some embodiments, the status is a Boolean value (e.g., 1 for correctly operational and 0 for an indication of a problem) while the explanation is a string.

Thus, if the aspect is healthy, the process 800 includes (at 820) a healthy status (e.g., a Boolean value of 1) as well as an associated reason in the health status data response to provide to the health monitoring service. When the status value specifies that the particular aspect of the service is operating correctly, the explanation may simply state that the aspect is healthy or is operating correctly. That is, no further explanation is required when the status is currently healthy.

On the other hand, when the status specifies that the particular aspect of the service is not operating correctly, the process 800 identifies (at 825) a reason that the aspect is not healthy based on matching current conditions to a set of criteria. The process 800 includes (at 830) this non-healthy status (e.g., a Boolean value of 0) as well as the identified reason in the health data response.

In some embodiments, when an aspect is deemed unhealthy (i.e., not operating correctly), the service selects from a set of possible reasons based on a set of criteria. In some embodiments, the possible reasons are provided in a priority order, and the service starts with the first possible reason to determine whether the criteria for providing that reason are matched. If the criteria are not matched, the service moves to the next reason, until one is identified. In some embodiments, a default reason is provided (e.g., "connection failed" or "thread not executing") in case the criteria are not matched for any of the other reasons. Different health aspects may have different numbers and types of possible reasons for an unhealthy status. In some embodiments, these possible reasons are configured as part of the development of the service.

As mentioned, FIG. 9 illustrates an example health status data output 900 for a policy management microservice of a policy manager service instance of some embodiments. This output is for a particular time snapshot and can change if the status of any of the various health status data aspects changes. As shown, the health output includes a consolidated status and reason that summarizes the overall health status of the service. In this case, because several of the runtime health aspects of the service are unhealthy, the consolidated status is given the value 0 along with a reason of "several aspects failed". The individual health status data aspects are then divided into the basic (static) aspects and runtime aspects. As shown, the static aspects include general initialization ("init") as well as the status of two routines ("intent" and "provider"). In this case, both of these routines are operational and the service was successfully initialized, so all of the static aspects are indicated as healthy along with accompanying reasons.

Returning to FIG. 8, the process 800 determines (at 835) whether any additional static aspects remain for evaluation. If additional static aspects remain, the process 800 returns to 810 to select the next static health aspect. Once all of the static health aspects have been evaluated, the process 800 selects (at 840) a runtime health aspect for evaluation. It should be understood that the process 800 is a conceptual process and that the services need not perform the specific operations of this process in some embodiments. For instance, rather than sequentially selecting and checking each static health aspect of the service followed by sequentially selecting and checking each runtime health aspect of the service, some embodiments perform these operations in parallel for each (or for at least a subset) of the health aspects. Different embodiments may check each of the static health aspects in parallel and then check each of the runtime health aspects in parallel, check all of the health aspects (both static and runtime in parallel), check groups of health aspects in parallel, etc.

As indicated, the runtime aspects of a service are aspects that are runtime-dependent (e.g., that relate to the service performing its runtime operations successfully). These runtime aspects may include connections to other microservices (of the same service instance), databases, or other services (e.g., other service instances or third-party services), the status of a buffer or queue used by the service, etc. In some embodiments, if any of these aspects are considered non-operational or unhealthy, the service cannot perform all of its operations correctly.

The process 800 then determines (at 845) whether the selected health aspect is currently healthy. In some embodiments, the runtime health aspects are more volatile and change from healthy to unhealthy more often than the static health aspects. The runtime health aspects are more likely to depend on external factors. For instance, the connection to a particular database could be down because the database itself is down, a physical connection is down in the network, or due to an internal problem of the service providing the health status data.

If the selected aspect is healthy, the process 800 includes (at 850) a healthy status (e.g., a Boolean value of 1) as well as an associated reason in the health status data response to provide to the health monitoring service. When the status value specifies that the particular aspect of the service is operating correctly, the explanation may simply state that the aspect is healthy or is operating correctly. That is, no further explanation is required when the status is currently healthy.

On the other hand, when the status specifies that the particular aspect of the service is not operating correctly, the process 800 identifies (at 855) a reason that the aspect is not healthy based on matching current conditions to a set of criteria. The process 800 includes (at 830) this non-healthy status (e.g., a Boolean value of 0) as well as the identified reason in the health data response.

In some embodiments, when an aspect is deemed unhealthy (i.e., not operating correctly), the service selects from a set of possible reasons based on a set of criteria. In some embodiments, the possible reasons are provided in a priority order, and the service starts with the first possible reason to determine whether the criteria for providing that reason are matched. If the criteria are not matched, the service moves to the next reason, until one is identified. In some embodiments, a default reason is provided (e.g., "connection failed" or "thread not executing") in case the criteria are not matched for any of the other reasons. Different health aspects may have different numbers and types of possible reasons for an unhealthy status. In some embodiments, these possible reasons are configured as part of the development of the service.

In FIG. 9, five different health status aspects are provided in the "runtime" category. These include the operation of two components of the microservice (the "ar" and "search" components) as well as the connection to the Corfu database, the successful discovery of all of the sites (datacenters) managed by the policy manager service instance (i.e., the ability to connect to these sites and retrieve their logical network policy configuration), and whether messages to the local managers at these sites are received. In this case, both the search and AR components, as well as the connection to the Corfu database, have failed and thus these aspects are represented as unhealthy in the health status data. The policy service identifies the reasons for these failures and provides this information along with the status information.

Next, the process 800 determines (at 865) whether any additional runtime health aspects remain for evaluation. If additional runtime aspects remain, the process 800 returns to 840 to select the next runtime health aspect. Once all of the runtime health aspects have been evaluated, the process 800 provides (at 870) the health status data report to the health monitoring service. The process 800 then ends.

In some embodiments, the process also generates a consolidated status and includes this in the health status data report provided in response to the API request. In some embodiments, the consolidated status is either healthy (1) when all health aspects for the service are healthy or unhealthy (0) when one or more health aspects for the service are unhealthy. In some embodiments (as in FIG. 9), the consolidated status also includes a reason (e.g., "all aspects healthy", "X aspect failed", "several runtime aspects failed", etc.).

To provide the health status data report to the monitoring service, in some embodiments the service sends an API response to the health monitoring service with the formatted health status data (e.g., as a JSON document). In some embodiments, the formatted response includes a timestamp, as the data is collected periodically. In other embodiments, the health monitoring service adds a timestamp to the data upon receipt. As noted, in some embodiments all of the health monitoring data is stored (e.g., as time series data) in a data store (e.g., a JSON-based document for storing the JSON-formatted health monitoring data).

Such a data store enables a user interface (UI) to query for the health monitoring data and present this data in a useful format to a user (e.g., a network or security administrator). In some embodiments, this UI displays representations of the health status for a set of the services operating in the system. In some embodiments, the UI is generated by a service (e.g., a common service) of the system (e.g., of the network management system). In other embodiments, a third-party service (e.g., Wavefront) that operates outside of the container cluster accesses the time series data (e.g., through a proxy running in the container cluster) and generates various visualizations (e.g., dashboards) to present the health data in a GUI.

Figure 10:
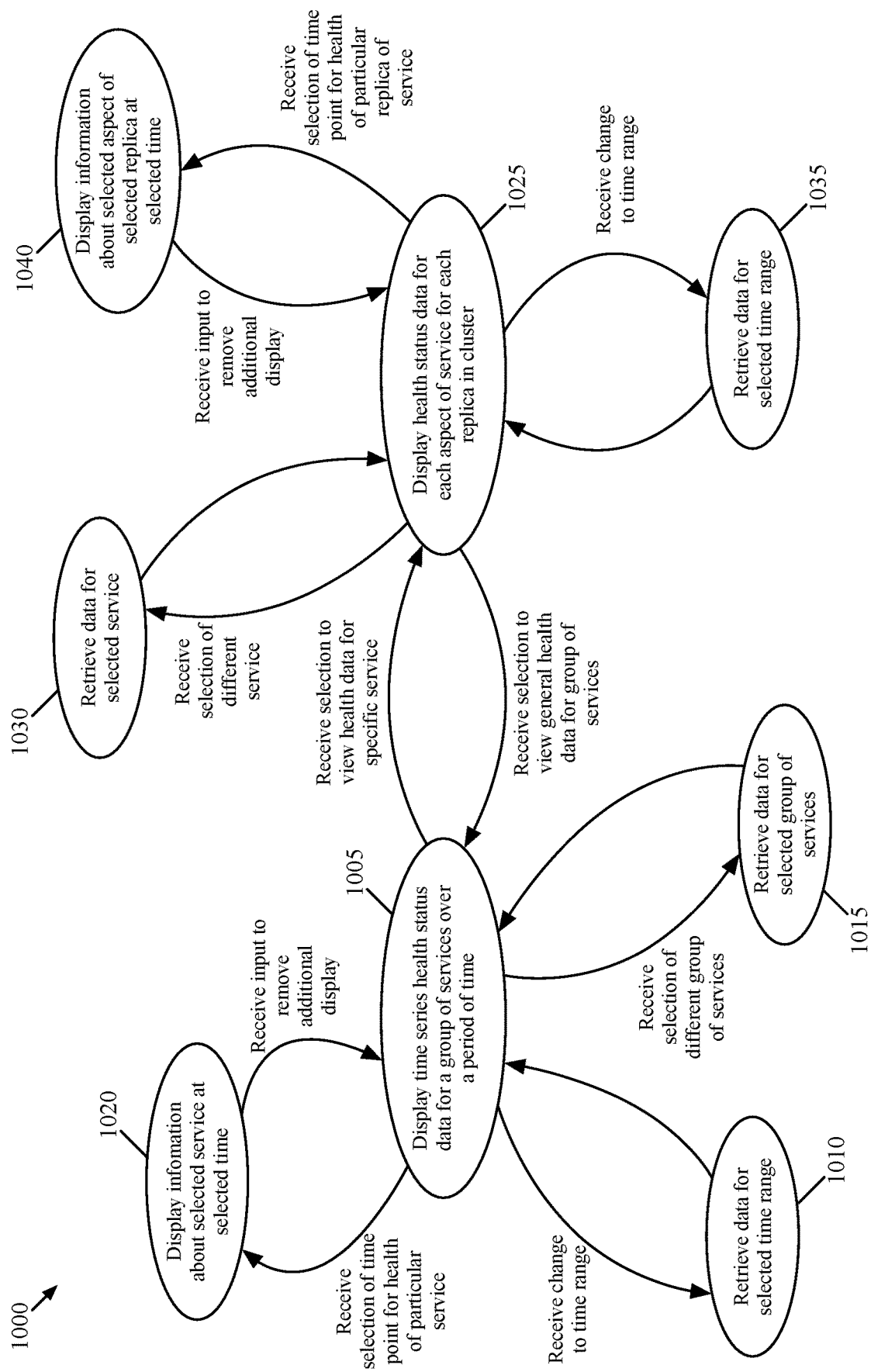
FIG. 10 conceptually illustrates a state diagram showing different states of a health status data visualization GUI of some embodiments and transitions between these states.

FIG. 10 conceptually illustrates a state diagram 1000 showing different states of a health status data visualization GUI of some embodiments and transitions between these states. This state diagram will be described in part by reference to FIGS. 11-14, which illustrate a health status data GUI of some embodiments that displays time series health status data for various services in a network management system.

As shown, in a default state 1005 (e.g., when the GUI is first displayed) of some embodiments, the GUI displays time series health status data for a group of services over a period of time. In some embodiments, for each service, the GUI displays a representation of the consolidated status for each service (e.g., healthy if all aspects of the service are healthy and unhealthy if any of the aspects of the service are unhealthy).

For different users, different groups of services are displayed in the GUI in some embodiments. For example, for a system administrator with access to the entire network management system), some embodiments display (or at least provide the option to display) all of the common services as well as all of the microservices of the tenant-specific service instances executing in the container cluster for the system. In many cases, the number of tenant-specific service instances is much larger than could possibly be shown in a GUI (when displaying separate health status visualizations for each microservice of these service instances), so the GUI provides the user the ability to select a group of services (e.g., a specific service instance, the common services, etc.). Some embodiments allow tenant users of the system to view health status information as well. However, these tenant users can view only the health status data for the services belonging to service instances managing the data for that tenant's datacenter group or groups, but not for any other services in the system. In other embodiments, the health monitoring data is not visible to the tenant users.

Figure 11:
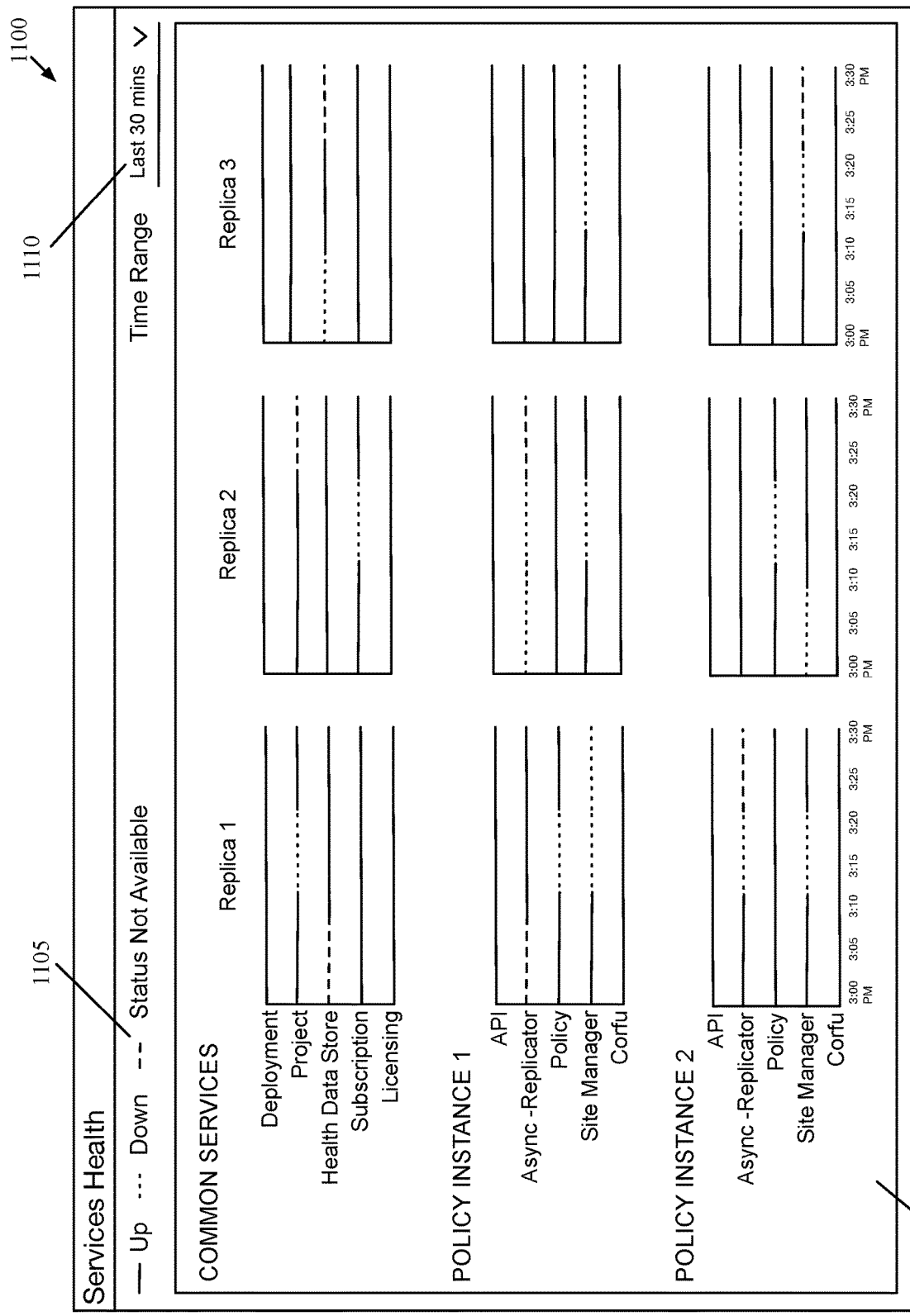
FIG. 11 illustrates a health status visualization GUI of some embodiments that displays representations of the health status for various groups of services as time series data.

FIG. 11 illustrates a health status visualization GUI 1100 of some embodiments that displays representations of the health status for various groups of services as time series data. As shown, this health status visualization GUI 1100 includes a health status legend 1105, a time range selection item 1110, and a health status display 1115. The health status legend 1105 indicates how the health status of the various services are displayed, in this case using a solid line when the status is up (healthy), a dotted line when the status is down (unhealthy), and a dashed line when the status is not available (e.g., because no data was collected for the service at a given time). In different embodiments, the different statuses may be represented using different colors (e.g., green/red for healthy/unhealthy), different types of lines, etc.

The time range selection item 1110 enables the user to select a time range over which the health status data is visualized in the health status display 1115. In this example, the time range is currently set to show the last 30 minutes, but this time range can be changed to show a shorter time range (e.g., the last 10 minutes) or a longer time range (e.g., the last 6 hours, last 24 hours, etc.). In some embodiments, the time range selection item 1110 allows a user to input a custom time range (e.g., to view the status for a particular hour during the previous day).

The health status display 1115 displays the health status for a group of services (or, as described below, the different aspects of a selected service). In this case, the health status display 1115 provides a visualization of the health status for common services as well as two different policy management service instances. In this case, the health status visualization for the common services and each of the service instances are provided in separate sections of the health status display 1115. Other embodiments group all of the services together or display only a single group of services (e.g., only the common services, only the services of a single service instance) along with a UI item that allows the user to toggle between groups of services.

As shown, when multiple replicas of each service execute in the container cluster (e.g., in different availability zones), the health status display 1115 includes the health status visualization for each replica, as the health status is often different for different replicas of a given service. In this case, there are three replicas instantiated in the container cluster for each service that is shown in the health status display 1115. In some embodiments, different numbers of replicas will execute for different services (e.g., more replicas of the common services than the services of a given service instance). In this case, space is provided for the largest number of replicas that are instantiated for any of the services, with some of the space left blank for services with fewer replicas. For instance, in the illustrated example, if the common services have five replicas while each of the services of the policy manager service instances have three replicas, then the display would provide visualization for health status of five replicas but would leave the last two spaces empty for the services of the policy manager service instances.

The actual visualization shown in FIG. 11 shows when different replicas of the different services are healthy or unhealthy (or when the health status is not available). For instance, the first replica of the project service (a common service) was down from 3:10 PM to 3:20 PM, the second replica of the subscription service (another common service) was down during this time period. As noted above, in some embodiments, the status of a given service is based on the consolidated status for that service at a given time according to the time series data stored in the health data store.

Returning to FIG. 10, from state 1005, various selection operations can be performed in order to manipulate the health status visualization GUI 1100. It should be understood that some embodiments will have many different states relating to all different types of input events that are not shown here, and that the state diagram 1000 is specifically focused on a subset of these events. That is, many types of operations can be performed in the health status visualization GUI of some embodiments (e.g., displaying information about specific replicas of specific services, etc.) that are not described by reference to the state diagram 1000, and that this state diagram should not be construed as limiting the types of interactions available in such a health status visualization GUI. Further, it should be understood that various interactions, such as cursor controller gestures and button clicks, keyboard input, touchpad/trackpad input, etc., may be used for selection operations described herein.

If the GUI, while in state 1005, receives a selection to change the time range (e.g., via the time range selection item 1110), then the GUI transitions to state 1010 to retrieve the data for the selected time range for the services currently displayed in the health status display 1115. In some embodiments, the GUI service of the network management system retrieves this data from the health data store. The GUI then transitions back to state 1005 to modify the health status display to show the representations of the health status of the services for the newly selected time range.

The GUI can also receive a selection to display health information for a different group of services (e.g., through a selection item not shown in FIG. 11). For instance, a network administrator might want to view only the common services, only the services for a specific service instance, or the services for a set of service instances managing a particular group of datacenters. A tenant user might choose to view only a specific one of multiple service instances managing their group of datacenters. In this case, the GUI transitions to state 1015 to retrieve the data for the selected group of services (e.g., from the health data store), then transitions back to state 1005 to modify the health status display to show the representations of the health status for this newly selected group of services.

Figure 12:
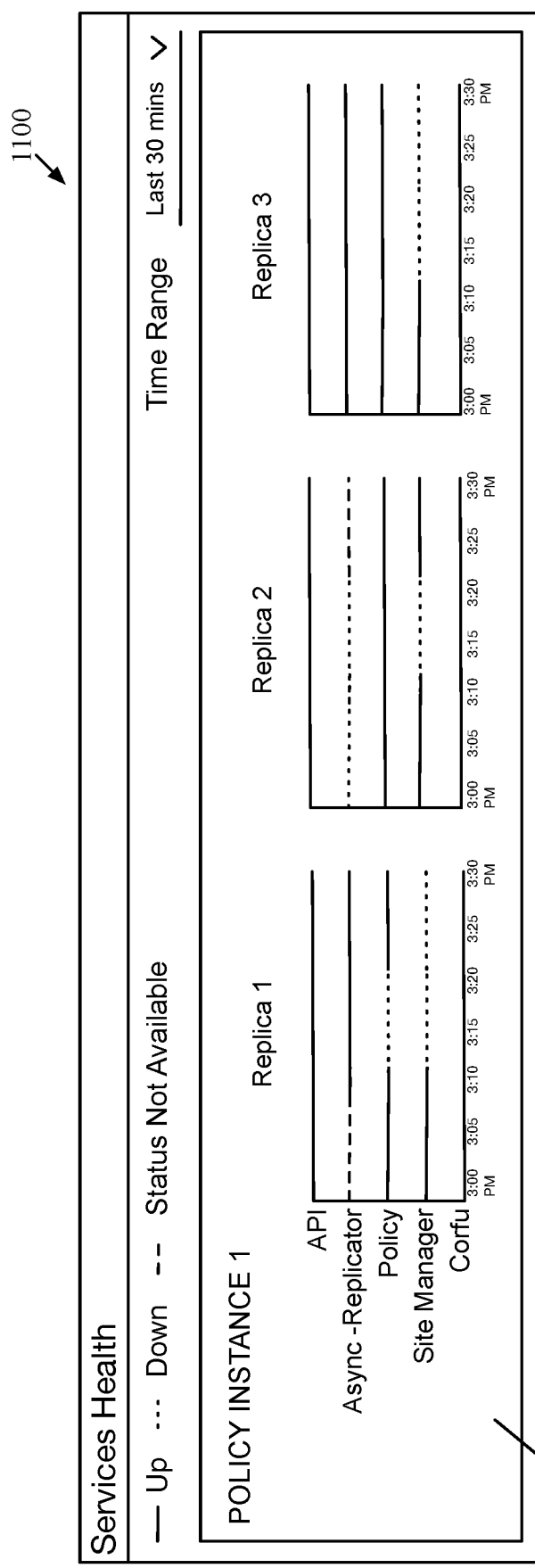
FIG. 12 illustrates the health status visualization GUI when only the services for a single service instance are displayed.

FIG. 12 illustrates the health status visualization GUI 1100 when only the services for a single service instance (policy instance 1) are displayed. This could be the result of a selection by the user to only view these services, or because the user is a tenant for which the policy manager service instance is the only deployed service instance. As shown, the health status display 1115 now only shows the representation of the health status data for these five services.

In some embodiments, the GUI may also receive a selection of a particular time point in the health status representation for a particular service. This selection may be via a cursor click, a cursor hover (over the time point), etc.

Upon receiving such a selection, the GUI transitions to state 1020 to display information about the selected service at the selected time. In some embodiments, the GUI provides a pop-up display (similar to that described below by reference to FIG. 14) that indicates the time, service, status, and reason. If the status is down, some embodiments provide additional information as to which aspects of the service were down at that time. In addition, some embodiments provide information about the node on which the specific selected replica executes. When the GUI receives input to remove this additional display (e.g., the user closes the display or moves the cursor so that the cursor is no longer over the health status representation for that service/replica, the GUI transitions back to state 1005 to display the health status data without the additional display.

Within the UI, the user can select a specific service in some embodiments in order to view the health status of the different aspects for which the service reports health data. When a specific service is selected, the GUI transitions to state 1025 to display the health status data for each aspect of that selected service for each replica of the service executing in the container cluster. Here, rather than display simply the consolidated status, the GUI displays the health status time series (still as healthy/unhealthy) for each aspect reported by the selected service (e.g., each basic and each runtime aspect of the health data).

Figure 13:
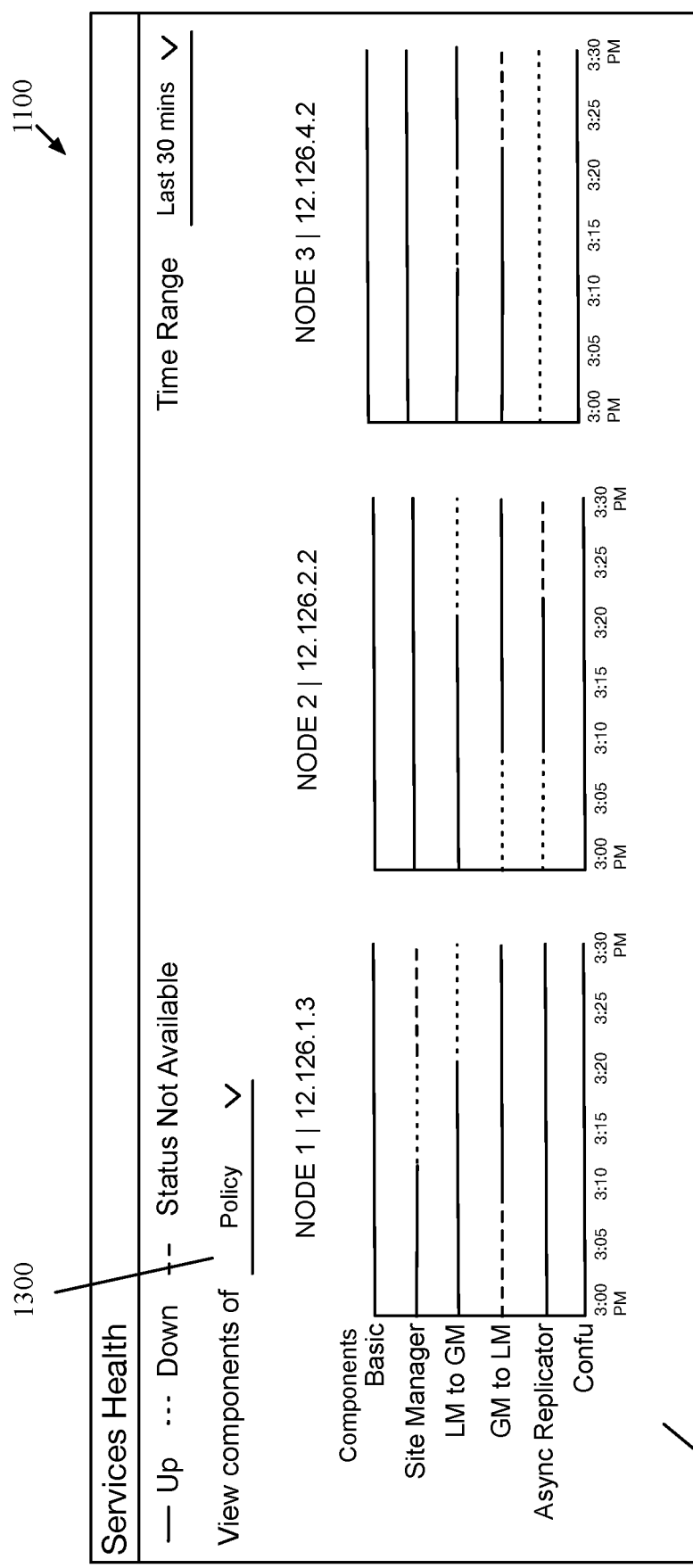
FIG. 13 illustrates the GUI with the policy service of one of the policy manager service instances selected.

FIG. 13 illustrates the GUI 1100 with the policy service of one of the policy manager service instances selected. Within the health status display 1115, a time series visualization is displayed for different health aspects that are recorded for the policy manager microservice of the policy management service instance. These health aspects (labeled as components) in this case include a basic component (e.g., whether the service is up and running), a site manager component (e.g., whether the service can successfully communicate with the site manager microservice of the same service instance), an LM to GM component (e.g., whether local managers in the datacenters managed by the service instance are able to communicate with the policy microservice), a GM to LM component (e.g., whether the policy microservice is able to communicate with all of the local managers), an async replicator component (e.g., whether the policy microservice is able to communicate with the asynchronous replicator microservice of the service instance), and a Corfu component (e.g., whether the policy microservice is able to communicate with the Corfu microservice of the service instance).

Because the GUI 1100 only displays information for a single microservice (i.e., executing on a single Pod), specific information about each of the replicas can be displayed in the GUI. As shown, above the health status for each of the replicas, a node name ("Node 1", "Node 2", and "Node 3") is displayed along with a network address for that node. This provides the user with additional information that is useful for troubleshooting the service if needed.

The GUI 1100 also includes a service selection item 1300 when viewing a single service. This service selection item 1300 allows the user to quickly switch between different services to view within the GUI. In some embodiments, selection of this item 1300 provides a drop-down menu with the other services that the user can select. In different embodiments, the list of services provided in the drop-down menu includes all of the services to which the current user has access or only the other services in the same group of services (e.g., common services or the same service instance) as the currently viewed service.

Returning to FIG. 10, from the state 1025, if the GUI receives a selection of a different service for which to display health data, the GUI transitions to state 1030 to retrieve data for that service. The GUI then transitions back to state 1025 to display the health status data for each aspect of each replica of that newly selected service. For a given service instance, different microservices may have different numbers of aspects for which health status data is collected and may execute on different nodes, though typically the number of replicas of each microservice of the service instance will be the same.

The GUI may also receive a selection to change the time range (e.g., via the time range selection item 1110), in which case the GUI transitions to state 1035 to retrieve the data for the selected time range for the currently selected service. In some embodiments, the GUI service of the network management system retrieves this data from the health data store. The GUI then transitions back to state 1025 to modify the health status display to show the representations of the health status for the various aspects of the currently selected service for the new time range.

In some embodiments, the user may also select a particular time point in the health status representation for a particular aspect of a particular replica of a particular service. This selection may be via a cursor click, a cursor hover (over the time point), etc. Upon receiving such a selection, the GUI transitions to state 1040 to display information about the selected aspect at the selected time. When the GUI receives input to remove this additional display (e.g., the user closes the display or moves the cursor so that the cursor is no longer over the health status representation for that service/replica, the GUI transitions back to state 1025 to display the health status data without the additional display.

Figure 14:
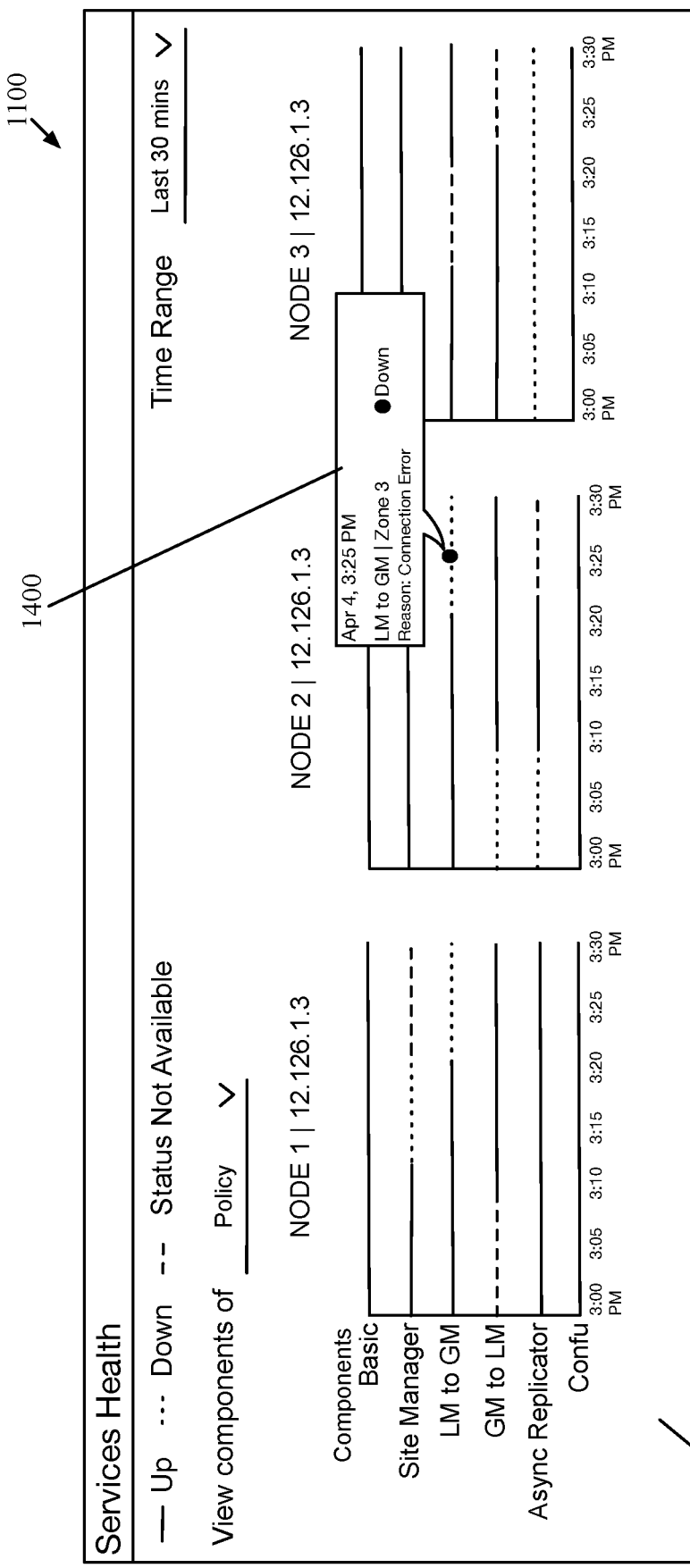
FIG. 14 illustrates the GUI as shown in FIG. 13 with a specific health aspect at a specific time selected.

FIG. 14 illustrates the GUI as shown in FIG. 13 with a specific aspect at a specific time selected (for the second of three replicas of the service). As shown, the user has selected (e.g., via a mouse-over, a cursor click, etc.) the LM to GM health aspect for the second replica at 3:25 PM. As a result, the GUI displays a pop-up display 1400 that provides additional information about the selected health aspect at the selected time. Specifically, this display 1400 indicates that the health aspect was down (non-operational) at this time, providing the reason of "connection error". In some embodiments, the reason shown in the pop-up display is the reason provided by the service in its health status data.

Figure 15:
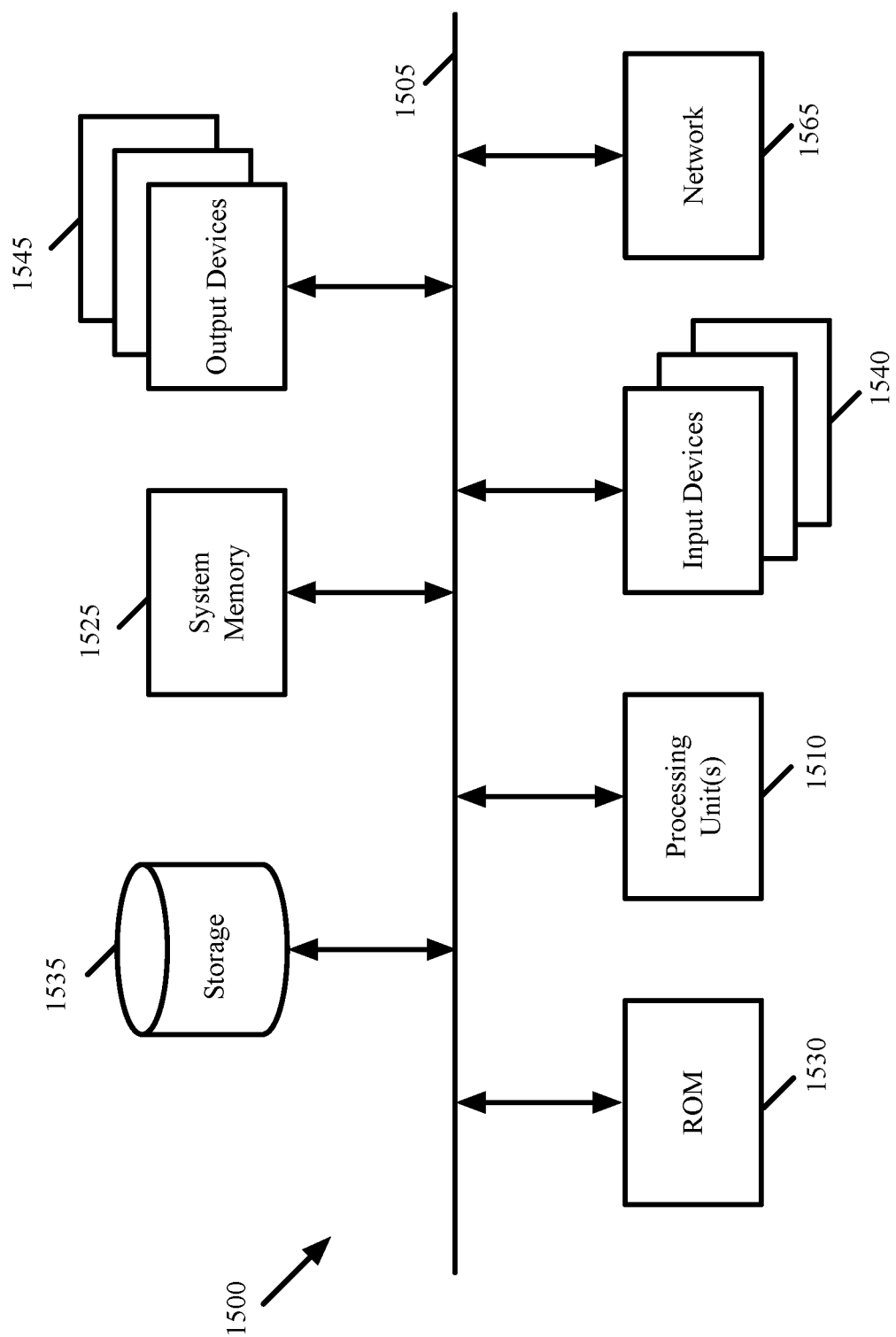
FIG. 15 conceptually illustrates an electronic system with which some embodiments of the invention are implemented.

FIG. 15 conceptually illustrates an electronic system 1500 with which some embodiments of the invention are implemented. The electronic system 1500 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1500 includes a bus 1505, processing unit(s) 1510, a system memory 1525, a read-only memory 1530, a permanent storage device 1535, input devices 1540, and output devices 1545.

The bus 1505 collectively represents all system, peripheral, and chipset buses that communicatively connect the numerous internal devices of the electronic system 1500. For instance, the bus 1505 communicatively connects the processing unit(s) 1510 with the read-only memory 1530, the system memory 1525, and the permanent storage device 1535.

From these various memory units, the processing unit(s) 1510 retrieve instructions to execute and data to process in order to execute the processes of the invention. The processing unit(s) may be a single processor or a multi-core processor in different embodiments.

The read-only-memory (ROM) 1530 stores static data and instructions that are needed by the processing unit(s) 1510 and other modules of the electronic system. The permanent storage device 1535, on the other hand, is a read-and-write memory device. This device is a non-volatile memory unit that stores instructions and data even when the electronic system 1500 is off. Some embodiments of the invention use a mass-storage device (such as a magnetic or optical disk and its corresponding disk drive) as the permanent storage device 1535.

Other embodiments use a removable storage device (such as a floppy disk, flash drive, etc.) as the permanent storage device. Like the permanent storage device 1535, the system memory 1525 is a read-and-write memory device. However, unlike storage device 1535, the system memory is a volatile read-and-write memory, such a random-access memory. The system memory stores some of the instructions and data that the processor needs at runtime. In some embodiments, the invention's processes are stored in the system memory 1525, the permanent storage device 1535, and/or the read-only memory 1530. From these various memory units, the processing unit(s) 1510 retrieve instructions to execute and data to process in order to execute the processes of some embodiments.

The bus 1505 also connects to the input and output devices 1540 and 1545. The input devices enable the user to communicate information and select commands to the electronic system. The input devices 1540 include alphanumeric keyboards and pointing devices (also called "cursor control devices"). The output devices 1545 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 15, bus 1505 also couples electronic system 1500 to a network 1565 through a network adapter (not shown). In this manner, the computer can be a part of a network of computers (such as a local area network ("LAN"), a wide area network ("WAN"), or an Intranet, or a network of networks, such as the Internet. Any or all components of electronic system 1500 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures (including FIGS. 6, and 8) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

The invention claimed is:

1. For a health monitoring service that monitors a system comprising a set of services executing across a set of one or more datacenters, a method comprising:
for each of a plurality of services monitored by the health monitoring service:
contacting an API exposed by the service to provide health monitoring data for the service; and
receiving health monitoring data for the service that provides, for each of a plurality of aspects of the service, (i) a status and (ii) an explanation for the status in a uniform format used by the APIs of each of the services of the plurality of services,
wherein at least two different services provide health monitoring data in the uniform format for different pluralities of aspects of the services, the health monitoring data being collected and stored by a common service at a health data store.

2. The method of claim 1, wherein:
the system is a multi-tenant network management system that executes in a public cloud to manage a plurality of groups of datacenters for a plurality of different tenants; and
the health monitoring service monitors the health of a set of multi-tenant services that are each accessed by the plurality of different tenants.

3. The method of claim 1, wherein:
the system is a multi-tenant network management system that executes in a public cloud to manage a plurality of groups of datacenters for a plurality of different tenants; and
the health monitoring service monitors the health of a plurality of services belonging to a particular service instance that performs network management operations for a particular group of datacenters for a particular tenant of the network management system.

4. The method of claim 3, wherein:
different health monitoring services of the multi-tenant network management system monitor different pluralities of services of different service instances that manage groups of datacenters for different tenants; and
all of the services of the different pluralities of services provide health monitoring data to their respective health monitoring services using the same uniform format.

5. The method of claim 3, wherein:
the system is deployed within a Kubernetes cluster;
the services are microservices assigned to a single namespace of the Kubernetes cluster; and
the health monitoring service is also assigned to the same namespace.

6. The method of claim 1, wherein the status for each aspect of each service is a Boolean variable specifying whether the respective aspect is operational and the explanation for each aspect of each service is a string variable specifying additional information describing the status of the service.

7. The method of claim 6, wherein when the status for a particular aspect specifies that the particular aspect is operational, the explanation for the particular aspect provides text indicating that the particular aspect is operational.

8. The method of claim 6, wherein when the status for a particular aspect of the service specifies that the particular aspect is not operational, the explanation for the particular aspect indicates a reason that the aspect is not operational.

9. The method of claim 8, wherein the explanation for the particular aspect is based on matching a set of criteria relating to the particular aspect of the service.

10. The method of claim 1, wherein the plurality of aspects of the service comprises a set of modules that execute within the service, wherein the status for each module specifies whether the module is currently executing properly.

11. The method of claim 1, wherein the plurality of aspects of the service comprises an initialization component, wherein the status for the initialization component specifies whether the service was initialized successfully.

12. The method of claim 1, wherein the plurality of aspects of the service comprises a set of connections to other services, wherein the status for each connection specifies whether the connection to the other service is currently up.

13. The method of claim 12, wherein the other services comprise at least one of (i) other services of the plurality of services monitored by the health monitoring service and (ii) external services.

14. The method of claim 1, wherein:
the plurality of aspects of the service comprises a set of static aspects and a set of runtime aspects;
the set of static aspects comprises a set of aspects that become operational at initialization of the service; and
the set of runtime aspects comprises a set of aspects of the service that operate as the service executes.

15. A non-transitory machine-readable medium storing a health monitoring service program that monitors a system comprising a set of services executing across a set of one or more datacenters, the program comprising sets of instructions for:
for each of a plurality of services monitored by the health monitoring service:
contacting an API exposed by the service to provide health monitoring data for the service; and
receiving health monitoring data for the service that provides, for each of a plurality of aspects of the service, (i) a status and (ii) an explanation for the status in a uniform format used by the APIs of each of the services of the plurality of services,
wherein at least two different services provide health monitoring data in the uniform format for different pluralities of aspects of the services, the health monitoring data being collected and stored by a common service at a health data store.

16. The non-transitory machine-readable medium of claim 15, wherein:
the system is a multi-tenant network management system that executes in a public cloud to manage a plurality of groups of datacenters for a plurality of different tenants; and
the health monitoring service monitors the health of a set of multi-tenant services that are each accessed by the plurality of different tenants.

17. The non-transitory machine-readable medium of claim 15, wherein:
the system is a multi-tenant network management system that executes in a public cloud to manage a plurality of groups of datacenters for a plurality of different tenants; and
the health monitoring service monitors the health of a plurality of services belonging to a particular service instance that performs network management operations for a particular group of datacenters for a particular tenant of the network management system.

18. The non-transitory machine-readable medium of claim 17, wherein:
different health monitoring services of the multi-tenant network management system monitor different pluralities of services of different service instances that manage groups of datacenters for different tenants; and
all of the services of the different pluralities of services provide health monitoring data to their respective health monitoring services using the same uniform format.

19. The non-transitory machine-readable medium of claim 17, wherein:
the system is deployed within a Kubernetes cluster;
the services are microservices assigned to a single namespace of the Kubernetes cluster; and
the health monitoring service is also assigned to the same namespace.

20. The non-transitory machine-readable medium of claim 15, wherein the status for each aspect of each service is a Boolean variable specifying whether the respective aspect is operational and the explanation for each aspect of each service is a string variable specifying additional information describing the status of the service.

21. The non-transitory machine-readable medium of claim 20, wherein:
when the status for a particular aspect of the service specifies that the particular aspect is not operational, the explanation for the particular aspect indicates a reason that the aspect is not operational; and
the explanation for the particular aspect is based on matching a set of criteria relating to the particular aspect of the service.

22. The non-transitory machine-readable medium of claim 15, wherein the plurality of aspects of the service comprises a set of modules that execute within the service, wherein the status for each module specifies whether the module is currently executing properly.

23. The non-transitory machine-readable medium of claim 15, wherein the plurality of aspects of the service comprises an initialization component, wherein the status for the initialization component specifies whether the service was initialized successfully.

24. The non-transitory machine-readable medium of claim 15, wherein the plurality of aspects of the service comprises a set of connections to other services, wherein the status for each connection specifies whether the connection to the other service is currently up.

25. The non-transitory machine-readable medium of claim 15, wherein:
the plurality of aspects of the service comprises a set of static aspects and a set of runtime aspects;
the set of static aspects comprises a set of aspects that become operational at initialization of the service; and
the set of runtime aspects comprises a set of aspects of the service that operate as the service executes.

* * * * *